US012776936B2

(12) United States Patent
Sun et al.

(10) Patent No.: US 12,776,936 B2
(45) Date of Patent: Oct. 27, 2026

(54) PHASE TRACKING REFERENCE SIGNAL CONFIGURATION

(71) Applicant: Apple Inc., Cupertino, CA (US)

(72) Inventors: Haitong Sun, Cupertino, CA (US); Ankit Bhamri, Bad Nauheim (DE); Chunxuan Ye, San Diego, CA (US); Dawei Zhang, Saratoga, CA (US); Hong He, San Jose, CA (US); Seyed Ali Akbar Fakoorian, San Diego, CA (US); Wei Zeng, Saratoga, CA (US)

(73) Assignee: Apple Inc., Cupertino, CA (US)

( * ) Notice: Subject to any disclaimer, the term of this patent is extended or adjusted under 35 U.S.C. 154(b) by 256 days.

(21) Appl. No.: 18/447,243

(22) Filed: Aug. 9, 2023

(65) Prior Publication Data

US 2024/0056341 A1 Feb. 15, 2024

Related U.S. Application Data

(60) Provisional application No. 63/396,933, filed on Aug. 10, 2022.

(51) Int. Cl.

*H04L 27/26* (2006.01)
*H04B 7/06* (2006.01)
*H04L 5/00* (2006.01)
*H04W 8/24* (2009.01)
*H04W 24/10* (2009.01)

(52) U.S. Cl.

CPC ........ *H04L 27/2613* (2013.01); *H04L 5/0051* (2013.01); *H04W 8/24* (2013.01)

(58) Field of Classification Search

CPC . H04L 27/2613; H04L 5/0051; H04L 5/0023; H04L 5/0048; H04L 5/0094; H04L 27/261; H04L 5/0053; H04W 8/24; H04W 24/10; H04B 7/0628

See application file for complete search history.

(56) References Cited

U.S. PATENT DOCUMENTS

2022/0200674 A1* 6/2022 Rahman ............... H04B 7/0404
2024/0365251 A1* 10/2024 Chen ..................... H04W 52/42
2025/0167954 A1* 5/2025 Lim ..................... H04B 7/0628

OTHER PUBLICATIONS

3GPP A Global Initiative, "3rd Generation Partnership Project; Technical Specification Group Radio Access Network; NR; User Equipment (UE) radio access capabilities (Release 17)," 3GPP TS 38.306 V17.1.0 (Jun. 2022), 224 pages.

3GPP A Global Initiative, "3rd Generation Partnership Project; Technical Specification Group Radio Access Network; NR; Multiplexing and Channel Coding (Release 17)," 3GPP TS 38.212 V17.2.0 (Jun. 2022), 201 pages.

3GPP A Global Initiative, "3rd Generation Partnership Project; Technical Specification Group Radio Access Network; NR; Physical layer procedures for data (Release 17)," 3GPP TS 38.214 V17.2.0 (Jun. 2022), 228 pages.

(Continued)

*Primary Examiner* — Harry H Kim

(74) *Attorney, Agent, or Firm* — Kilpatrick Townsend & Stockton LLP

(57) ABSTRACT

The present application relates to devices and components including apparatus, systems, and methods to support eight transmission operation for user equipments.

18 Claims, 12 Drawing Sheets

(56) References Cited

OTHER PUBLICATIONS

3GPP A Global Initiative, "3rd Generation Partnership Project; Technical Specification Group Radio Access Network; NR; Radio Resource Control (RRC) Protocol Specification (Release 17)," 3GPP TS 38.331 V17.1.0 (Jun. 2022), 1273 pages.

* cited by examiner

100

| Value | DMRS port |
|---|---|
| 0 | 1st scheduled DMRS port |
| 1 | 2nd scheduled DMRS port |
| 2 | 3rd scheduled DMRS port |
| 3 | 4th scheduled DMRS port |

FIG. 1

200

| Value of MSB | DMRS port | | Value of LSB | DMRS port |
|---|---|---|---|---|
| 0 | 1st DMRS port which shares PTRS port 0 | | 0 | 1st DMRS port which shares PTRS port 1 |
| 1 | 2nd DMRS port which shares PTRS port 0 | | 1 | 2nd DMRS port which shares PTRS port 1 |

FIG. 2

600

```
PTRS-UplinkConfig ::=            SEQUENCE {
    transformPrecoder Disabled       SEQUENCE{
        frequencyDensity             SEQUENCE (SIZE (2) ) OF INTEGER (1..276)    OPTIONAL    -- Need S
        timeDensity                  SEQUENCE (SIZE (3) ) OF INTEGER (0..29)     OPTIONAL    -- Need S
        maxNrofPorts                 ENUMERATED {n1, n2, n3, n4},
        resourceElementOffset        ENUMERATED {offset01, offset10, offset11 } OPTIONAL    -- Need S
        ptrs-Power                   ENUMERATED {p00, p01, p10, p11}            OPTIONAL    -- Need S
```

602

FIG. 6

700

```
SRS-Resource ::=                 SEQUENCE {
    srs-ResourceId                   SRS-ResourceId,
    nrofSRS-Ports                    ENUMERATED {port1, ports2, ports4},
    ptrs-PortIndex                   ENUMERATED {n0, n1}
```

702

FIG. 7

PHASE TRACKING REFERENCE SIGNAL CONFIGURATION

CROSS-REFERENCE TO RELATED APPLICATIONS

This application claims priority to U.S. provisional application No. 63/396,933, entitled "Phase Tracking Reference Signal Configuration," filed on Aug. 10, 2022, the disclosure of which is incorporated by reference herein in its entirety for all purposes.

TECHNICAL FIELD

The present application relates to the field of wireless technologies and, in particular, to phase tracking reference signal configuration.

BACKGROUND

User equipments (UEs) to be utilized with Third Generation Partnership Project (3GPP) networks utilize antennas to communicate with the networks. In particular, UEs include antennas that allow for the UEs to communicate with base stations of the networks. The antennas of the UE, in legacy embodiments, were limited in numbers and arrangement for a phase tracking reference signal.

BRIEF DESCRIPTION OF THE DRAWINGS

FIG. 1 illustrates an example phase tracking reference signal (PTRS)-demodulation reference signal (DMRS) association mapping in accordance with some embodiments.

FIG. 2 illustrates another example PTRS-DMRS association mapping in accordance with some embodiments.

FIG. 6 illustrates an example PTRS-uplinkconfig information element in accordance with some embodiments.

FIG. 7 illustrates an example sounding reference signal (SRS) resource information element in accordance with some embodiments.

DETAILED DESCRIPTION

Figure 3:
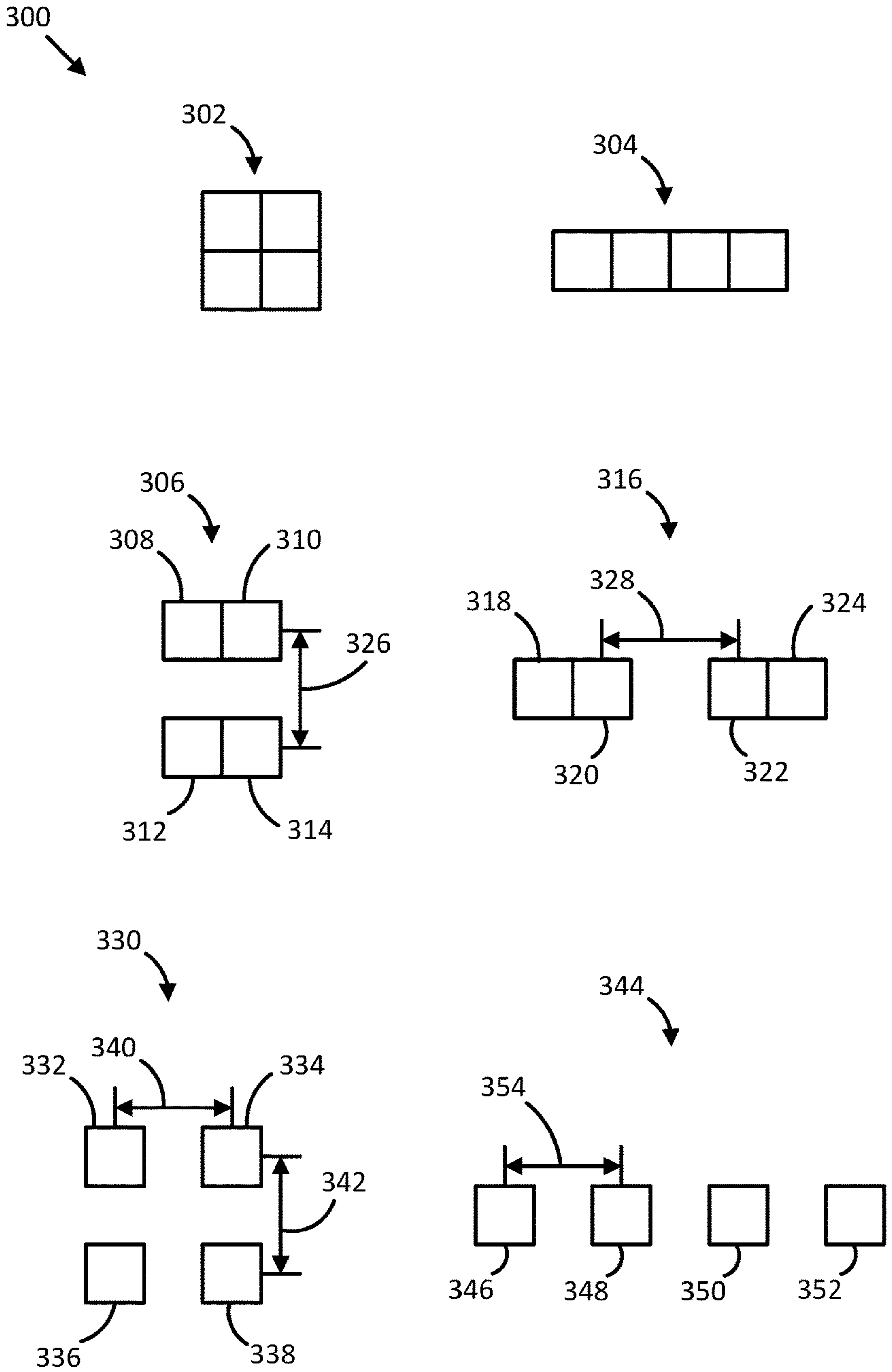
FIG. 3 illustrates example antenna architectures in accordance with some embodiments.

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail. For the purposes of the present document, the phrase "A or B" means (A), (B), or (A and B).

The following is a glossary of terms that may be used in this disclosure.

The term "circuitry" as used herein refers to, is part of, or includes hardware components such as an electronic circuit, a logic circuit, a processor (shared, dedicated, or group) or memory (shared, dedicated, or group), an application specific integrated circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable system-on-a-chip (SoC)), digital signal processors (DSPs), etc., that are configured to provide the described functionality. In some embodiments, the circuitry may execute one or more software or firmware programs to provide at least some of the described functionality. The term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The term "processor circuitry" as used herein refers to, is part of, or includes circuitry capable of sequentially and automatically carrying out a sequence of arithmetic or logical operations, or recording, storing, or transferring digital data. The term "processor circuitry" may refer an application processor, baseband processor, a central processing unit (CPU), a graphics processing unit, a single-core processor, a dual-core processor, a triple-core processor, a quad-core processor, or any other device capable of executing or otherwise operating computer-executable instructions, such as program code, software modules, or functional processes.

The term "interface circuitry" as used herein refers to, is part of, or includes circuitry that enables the exchange of information between two or more components or devices. The term "interface circuitry" may refer to one or more hardware interfaces, for example, buses, I/O interfaces, peripheral component interfaces, network interface cards, or the like.

The term "user equipment" or "UE" as used herein refers to a device with radio communication capabilities and may describe a remote user of network resources in a communications network. The term "user equipment" or "UE" may be considered synonymous to, and may be referred to as, client, mobile, mobile device, mobile terminal, user terminal, mobile unit, mobile station, mobile user, subscriber, user, remote station, access agent, user agent, receiver, radio equipment, reconfigurable radio equipment, reconfigurable mobile device, etc. Furthermore, the term "user equipment" or "UE" may include any type of wireless/wired device or any computing device including a wireless communications interface.

The term "computer system" as used herein refers to any type interconnected electronic devices, computer devices, or components thereof. Additionally, the term "computer system" or "system" may refer to various components of a computer that are communicatively coupled with one another. Furthermore, the term "computer system" or "system" may refer to multiple computer devices or multiple computing systems that are communicatively coupled with one another and configured to share computing or networking resources.

The term "resource" as used herein refers to a physical or virtual device, a physical or virtual component within a computing environment, or a physical or virtual component within a particular device, such as computer devices, mechanical devices, memory space, processor/CPU time, processor/CPU usage, processor and accelerator loads, hardware time or usage, electrical power, input/output operations, ports or network sockets, channel/link allocation, throughput, memory usage, storage, network, database and applications, workload units, or the like. A "hardware resource" may refer to compute, storage, or network resources provided by physical hardware element(s). A "virtualized resource" may refer to compute, storage, or network resources provided by virtualization infrastructure to an application, device, system, etc. The term "network resource" or "communication resource" may refer to resources that are accessible by computer devices/systems via a communications network. The term "system resources" may refer to any kind of shared entities to provide services, and may include computing or network resources. System resources may be considered as a set of coherent functions, network data objects or services, accessible through a server where such system resources reside on a single host or multiple hosts and are clearly identifiable.

The term "channel" as used herein refers to any transmission medium, either tangible or intangible, which is used to communicate data or a data stream. The term "channel" may be synonymous with or equivalent to "communications channel," "data communications channel," "transmission channel," "data transmission channel," "access channel," "data access channel," "link," "data link," "carrier," "radiofrequency carrier," or any other like term denoting a pathway or medium through which data is communicated. Additionally, the term "link" as used herein refers to a connection between two devices for the purpose of transmitting and receiving information.

The terms "instantiate," "instantiation," and the like as used herein refers to the creation of an instance. An "instance" also refers to a concrete occurrence of an object, which may occur, for example, during execution of program code.

The term "connected" may mean that two or more elements, at a common communication protocol layer, have an established signaling relationship with one another over a communication channel, link, interface, or reference point.

The term "network element" as used herein refers to physical or virtualized equipment or infrastructure used to provide wired or wireless communication network services. The term "network element" may be considered synonymous to or referred to as a networked computer, networking hardware, network equipment, network node, virtualized network function, or the like.

The term "information element" refers to a structural element containing one or more fields. The term "field" refers to individual contents of an information element, or a data element that contains content. An information element may include one or more additional information elements.

Phase tracking reference signal (PTRS) is used to facilitate the receiver to estimate the phase noise in new radio (NR). For example, transmissions between a UE and a base station may present phase noise. For uplink (UL) physical uplink shared channel (PUSCH), PTRS can be configured with maximum 2 ports. PTRS is associated with demodulation reference signal (DMRS) port by network (NW) indication. PTRS is transmitted in the same pattern as DMRS. DMRS to PTRS port association is indicated by the "PTRS-DMRS association" field in downlink control information (DCI) format 0_1/0_2. The "PTRS-DMRS association" field is either 0 or 2 bits.

When one single SRS-ResourceSet is configured with either "nonCodebook" or "codebook," the PTRS-DMRS association may be as indicated by FIG. 1 and/or FIG. 2. FIG. 1 illustrates an example PTRS-DMRS association mapping 100 in accordance with some embodiments. FIG. 2 illustrates another example PTRS-DMRS association mapping 200 in accordance with some embodiments.

The PTRS-DMRS association mapping 100 may indicate a mapping of a value to DMRS port in accordance with some embodiments. In particular, the network, via a base station, may provide the value to a UE to indicate a PTRS-DMRS association for the UE. The PTRS-DMRS association mapping 100 may indicate a PTRS-DMRS association or a second PTRS-DMRS association for UL PTRS port 0. The UE may receive the value from the base station and determine a DMRS port with which a PTRS for the UE is to be associated. As an example, a value of 0 may indicate a first scheduled DMRS port, as indicated in the PTRS-DMRS association mapping 100. Upon receiving a value of 0, the UE may determine that a PTRS for the UE is to be associated with a first scheduled DMRS port.

The PTRS-DMRS association mapping 200 may indicate a mapping of values to DMRS ports in accordance with some embodiments. In particular, the network, via a base station, may provide a most significant bit (MSB) and a least significant bit (LSB) to a UE to indicate a PTRS-DMRS association for the UE. The PTRS-DMRS association mapping 200 may indicate a PTRS-DMRS association or a second PTRS-DMRS association for UL PTRS ports 0 and 1. The UE may receive the MSB and the LSB from the base station. The MSB and the LSB may be received as part of a single value in some embodiments. The UE may determine a DMRS port with which a PTRS for the UE is to be associated based on MSB and the LSB. As an example, an MSB value of 0 may indicate a first DMRS port which shares PTRS port 0, as indicated in the PTRS-DMRS association mapping 200. A LSB value of 0 may indicate a first DMRS port which shares PTRS port 1. Upon receiving a value of 0, the UE may determine that a PTRS for the UE is to be associated with the indicated DMRS port.

For nonCodebook based PUSCH, DMRS to PTRS port association, for each nonCodebook based sounding reference signal (SRS)-resource, NW radio resource control (RRC) configures "ptrs-PortIndex." The association is determined based on the "SRS resource indicator field."

For codebook based PUSCH, DMRS to PTRS port association, the association is determined based on the "'Precoding information and number of layers" field. For "fullyAndPartialAndNonCoherent" codebook based PUSCH, only 1 port PTRS can be configured. For "partialAndNonCoherent" or "nonCoherent" codebook based PUSCH, PUSCH antenna port 1000 and 1002 in indicated TPMI(s) share PT-RS port 0 and PUSCH antenna port 1001 and 1003 in indicated TPMI(s) share PT-RS port 1.

In release 17 (Rel-17), for Multi-transmission and reception point (TRP) PUSCH, independent SRS resource set/SRS resource indicator (SRI)/transmit precoding matrix index (TPMI) can be indicated. For maxRank less than or equal to 2, 2-bit PT-RS to DMRS association is used to provide the indication for each TRP jointly. Most significant bit (MSB) and least significant bit (LSB) separately indicating the association between PTRS port and DMRS port for two TRPs. For maxRank greater than 2, a second phase tracking reference signal (PT-RS) to DMRS association field is introduced to provide the indication for the second TRP.

For release 18 (Rel-18) NR that is going to start in 2022, in the approved work item description (WID) (i.e., RP-213598), for multiple-input, multiple output (MIMO) Evolution for Downlink and Uplink, it is agreed to consider support 8 Tx UL operation. New antenna architecture has been agreed in the latest RANI #109 meeting. The new antenna architecture requires different phase noise handling, and therefore, PTRS enhancement.

5. Study, and if justified, specify UL DMRS, SRS, SRI, and TPMI (including codebook) enhancements to enable 8 transmission (Tx) UL operation to support 4 and more layers per UE in UL targeting customer premise equipment (CPE)/fixed wireless access (FWA)/vehicle/industrial devices. Note: Potential restrictions on the scope of this objective (including coherence assumption, full/non-full power modes) will be identified as part of the study.

The approaches described herein address PTRS enhancement for 8 Tx UL operation. UE capability reporting enhancement. NW configuration enhancement. nonCodebook PTRS port index.

Antenna Architecture

PTRS design relies on the assumption of antenna architecture, i.e., how many independent phase noise needs to be tracked from the transmitter. For example, depending on the number of antennas and the arrangement of the antennas, different PTRS approaches may be implemented. Antennas may have same or different phase noise based on the arrangement, and PTRS may be utilized for each of the antennas with different phase noises to determine the phase noise.

In the latest RANI #109 meeting, the following antenna architectures are agreed. For example, the architectures described in the following paragraphs may be implemented within a UE (such as the UE 1300 (FIG. 13)). The PTRS configuration for a UE may be dependent on which of these architectures has been implemented in the UE.

FIG. 3 illustrates example antenna architectures 300 in accordance with some embodiments. In particular, the antenna architectures 300 may illustrate arrangements of antennas and/or antenna panels that may be implemented within the UE. Each of the squares in the illustrated antenna architectures 300 may represent an antenna, where each of the antennas may have antenna elements that present two different polarizations. Accordingly, one antenna may provide two Tx UL operation and may support two layers.

A first antenna architecture may be referred to as "NonCoherent." In the noncoherent antenna architecture, the antennas may each have different phase noise sources. Accordingly, since each of the antennas have a different phase noise source, each antenna may have phase noise measured to determine the phase noise for each antenna. Noncoherent coherency as referred to herein may refer to instances where antennas of a UE do not have coherency, the phase error is to be determined individually for each of the antennas, and/or the antennas having eight different phase noise sources. Noncoherent coherency may be referred to as non-coherent coherency and in a configuration may be referred to via a non-coherent indication.

A second antenna architecture may be referred to as "FullCoherent." In the fullcoherent antenna architecture, all of the antennas may have a same phase noise source. The phase noise source may be dependent on the location of the antennas in the antenna architectures.

The antenna architectures 300 illustrate an example first antenna arrangement 302 that may be fullcoherent. As can be seen from the first antenna arrangement 302 illustrated, the antennas of the first antenna arrangement 302 may be located adjacent to each other to form a square. The first antenna arrangement 302 may be referred to as a 1-*a* antenna arrangement.

Further, the antenna architectures 300 illustrate an example second antenna arrangement 304 that may be fullcoherent. As can be seen from the second antenna arrangement 304 illustrated, the antennas of the second antenna arrangement 304 may be located adjacent to each other to form a line. The second antenna arrangement 304 may be referred to as a 1-*b* antenna arrangement.

The locations of the antennas in the first antenna arrangement 302 and the second antenna arrangement 304 being located adjacent to each other may cause there to be a single phase noise source. Accordingly, since the first antenna arrangement 302 and the second antenna arrangement 304 have a single phase noise source, the antenna arrangements may be fullcoherent. Fullcoherent coherency as referred to herein may refer to instances where all the antennas of a UE have coherency, the phase error for all of the antennas can be determined together, all of the antennas having a same phase source error, and/or the arrangement of the antennas. Fullcoherent coherency may be referred to as full-coherent coherency and in a configuration may be referred to via a full-coherent indication.

A third antenna architecture may be referred to as "PartialCoherent2." The partialcoherent2 antenna architecture may have 2 antenna panels (antenna groups), each with 4 antenna elements. The partialcoherent2 antenna architecture may be coherent within each antenna panel, i.e., one phase noise and non-coherent across different antenna panel, i.e., different phase noise.

The antenna architectures 300 illustrate an example third antenna arrangement 306 that may be partialcoherent2. As can be seen from the third antenna arrangement 306 illustrated, a first antenna 308 and a second antenna 310 may be located adjacent to each other and a third antenna 312 and a fourth antenna 314 may be located adjacent to each other. However, the first antenna 308 and the second antenna 310 may be separated by a distance 326 from the third antenna 312 and the fourth antenna 314. The third antenna arrangement 306 may be similar to a square with separation between the first group of antennas (including the first antenna 308 and the second antenna 310) and the second group of antennas (including the third antenna 312 and the fourth antenna 314). The third antenna arrangement 306 may be referred to as a 2-*a* antenna arrangement.

The antenna architectures 300 illustrate an example fourth antenna arrangement 316 that may be partialcoherent2. As can be seen from the fourth antenna arrangement 316, a first antenna 318 and a second antenna 320 may be located adjacent to each other and a third antenna 322 and a fourth antenna 324 may be located adjacent to each other. However, the first antenna 318 and the second antenna 320 may be separated by a distance 328 from the third antenna 322 and the fourth antenna 324. The fourth antenna arrangement 316 may be similar to a line with separation between the first group of antennas (including the first antenna 318 and the second antenna 320) and the second group of antennas (including the third antenna 322 and the fourth antenna 324). The fourth antenna arrangement 316 may be referred to as a 2-*b* antenna arrangement.

The locations of the antennas in the third antenna arrangement 306 and the fourth antenna arrangement 316 may have two phase noise sources. For example, the first antenna 308 and the second antenna 310 being located adjacent to each other may have a first phase noise source for the third antenna arrangement 306. The third antenna 312 and the fourth antenna 314 being located adjacent to each other may have a second phase noise source for the third antenna arrangement 306, which the second phase noise source may be different from the first phase noise source based on the first group of antennas being separated from the second group of antennas. The first antenna 318 and the second antenna 320 being located adjacent to each other may have a first phase noise source for the fourth antenna arrangement 316. The third antenna 322 and the fourth antenna 324 being located adjacent to each other may have a second phase noise source for the fourth antenna arrangement 316, which the second phase noise source may be different from the first phase noise source based on the first group of antennas being separated from the second group of antennas. Since the third antenna arrangement 306 and the fourth antenna arrangement 316 have two phase noise sources, the antenna arrangements may be partialcoherent2. Partialcoherent2 coherency as referred to herein may refer to instances where antennas of a UE have coherency for adjacent groups of two antennas, the phase error for the antenna can be determined for the adjacent groups of two antennas, the antennas have two separate phase noise sources, and/or the arrangement of the antennas. Partialcoherent2 coherency may be referred to as first partial-coherency and in a configuration may be referred to via a first partial-coherent indication.

A fourth antenna architecture may be referred to as "PartialCoherent4." The partialcoherent4 antenna architecture may have 4 antenna panels (antenna groups), each with 2 antenna elements. The partialcoherent4 may be coherent within each antenna panel, i.e., one phase noise and non-coherent across different antenna panel, i.e., different phase noise.

The antenna architectures 300 illustrate an example fifth antenna arrangement 330 that may be partialcoherent4. As can be seen from the fifth antenna arrangement 330, all of the antennas may be separated from each other. In particular, a first antenna 332 may be separated from a second antenna by a distance 340 in a first direction. Further, a third antenna 336 may be separated from a fourth antenna 338 by the distance 340 in the first direction. The first antenna 332 may be separated from the third antenna 336 by a distance 342 in a second direction, the second direction being perpendicular to the first direction. The second antenna 334 may be separated from the fourth antenna 338 by the distance 342 in the second direction. The fifth antenna arrangement 330 may be similar to a square with the distances separating the antennas. The fifth antenna arrangement 330 may be referred to as a 3-*a* antenna arrangement.

The antenna architectures 300 illustrate an example sixth antenna arrangement 344 that may be partialcoherent4. As can be seen from the sixth antenna arrangement 344, all of the antennas may be separated from each other. In particular, a first antenna 346 may be separated from a second antenna 348 by a distance 354 in a direction. The second antenna 348 may be separated from a third antenna 350 by the distance 354 in the direction. The third antenna 350 may be separated from a fourth antenna 352 by the distance 354 in the direction. The sixth antenna arrangement 344 may be similar to a line with distances separating the antennas. The sixth antenna arrangement 344 may be referred to as a 3-*b* antenna arrangement.

The locations of the antennas in the fifth antenna arrangement 330 and the sixth antenna arrangement 344 may have four phase noise sources. For example, each of the first antenna 332, the second antenna 334, the third antenna 336, and the fourth antenna 338 may present different phase noise sources due to the separation between the antennas, resulting in four phase noise sources for the fifth antenna arrangement 330. Each of the first antenna 346, the second antenna 348, the third antenna 350, and the fourth antenna 352 may present different phase noise sources due to the separation between the antennas, resulting in four phase noise sources for the sixth antenna arrangement 344. Since the fifth antenna arrangement 330 and the sixth antenna arrangement 344 have four phase noise sources, the antenna arrangements may be partialcoherent4. Partialcoherent4 coherency as referred to herein may refer to instances where antennas of a UE have coherency for a single antenna, the phase error for the antenna can be determined for the each of the antennas, the antennas have four separate phase noise sources, and/or the arrangement of the antennas. Partialcoherent4 coherency may be referred to as second partial-coherency and in a configuration may be referred to via a second partial-coherent indication.

UE Capability Reporting

As part of configuring the PTRS for a UE, the network may utilize characteristics of the UE to determine a proper configuration for the UE. As different UEs may have different characteristics, it may be beneficial for the UE to report the characteristics of the UE to the network such that the network may be able to determine the proper configuration for the UE. The UE may report the characteristics in a UE capability report transmitted from the UE to base station of the network.

Figure 4:
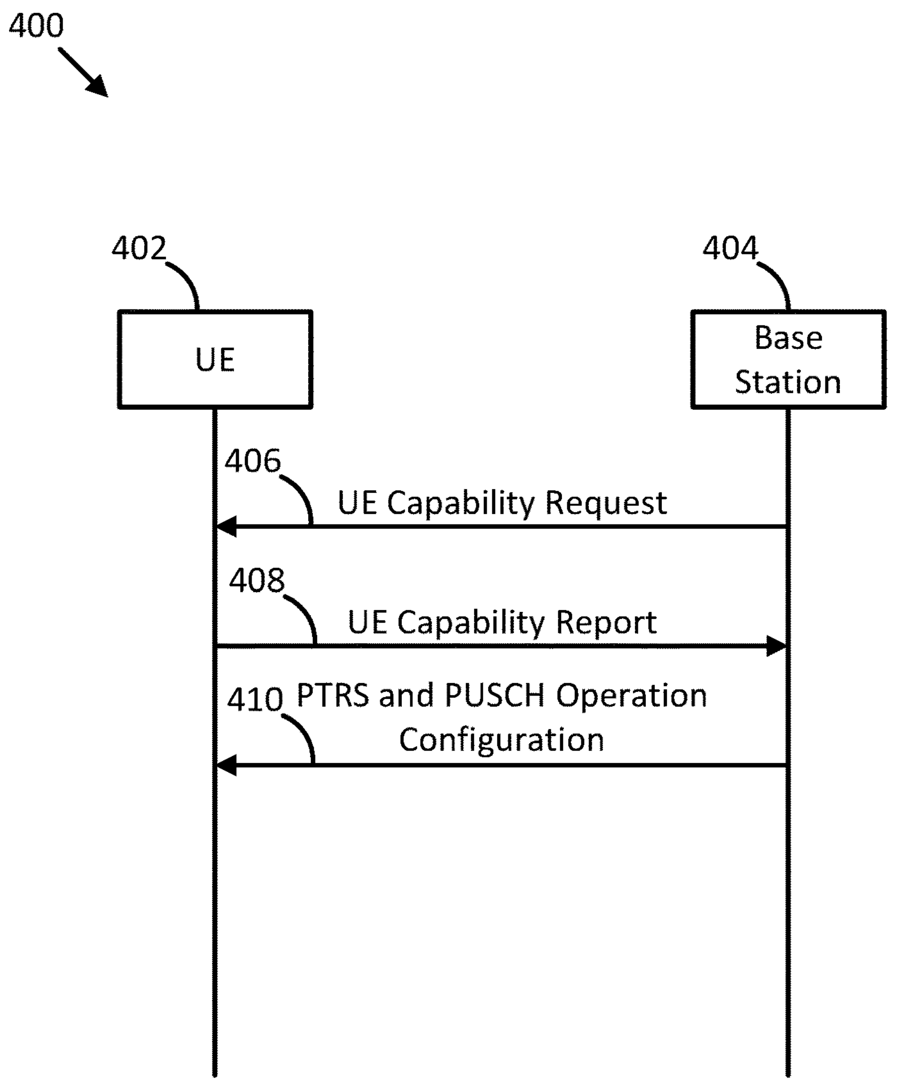
FIG. 4 illustrates an example signaling chart related to PTRS configuration in accordance with some embodiments.
Figure 13:
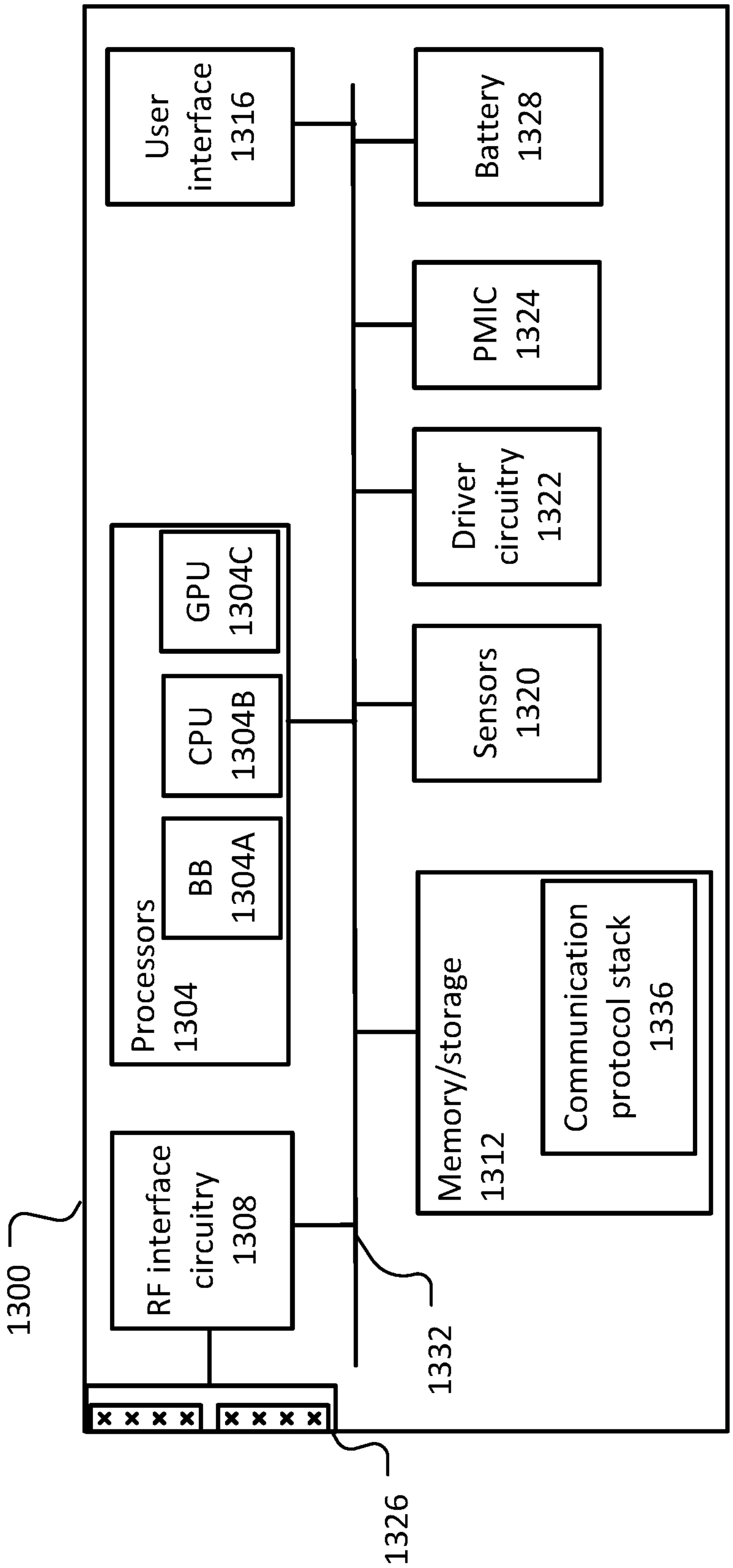
FIG. 13 illustrates an example user equipment (UE) in accordance with some embodiments.
Figure 14:
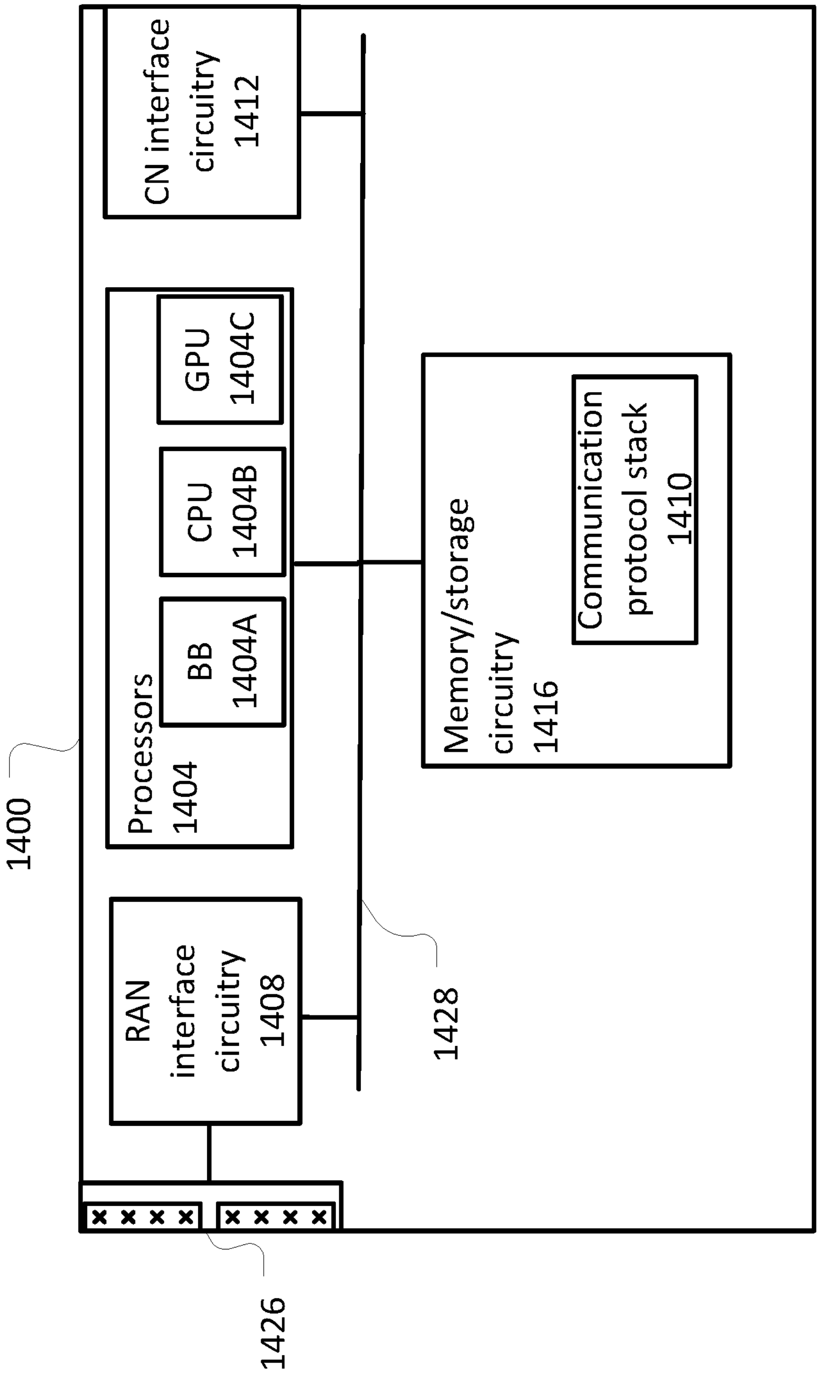
FIG. 14 illustrates an example next generation nodeB (gNB) in accordance with some embodiments.

FIG. 4 illustrates an example signaling chart 400 related to PTRS configuration in accordance with some embodiments. In particular, the signaling chart 400 illustrates example transmissions that may be exchanged between a UE 402 and a base station 404. The UE 402 may include one or more of the features of the UE 1300 (FIG. 13). The base station 404 may include one or more of the features of the gNB 1400 (FIG. 14).

The base station 404 may transmit a UE capability request 406 to the UE 402. The UE capability request 406 may request that the UE report the UE capability of the UE 402.

The UE 402 may receive and identify the UE capability request 406 received from the base station 404. The UE 402 may determine that the UE capability request 406 is requesting that the UE 402 report the UE capability of the UE 402. Based on the UE capability request 406, the UE 402 may generate a UE capability report message 408. The UE capability report message 408 may include a UE capability report. The UE capability report message 408 may include indications of one or more characteristics of the UE 402, as described further throughout this disclosure. The UE 402 may transmit the UE capability report message 408 to the base station 404.

The base station 404 may receive and identify the UE capability report message 408. The base station 404 may determine the characteristics of the UE 402 based on the UE capability report message 408. Based on the determined characteristics of the UE 402, the base station 404 may determine a PTRS configuration for the UE 402. The base station 404 may generate a PTRS and PUSCH operation configuration message 410 that indicates the PTRS configuration for the UE 402, as described further throughout this disclosure. The base station 404 may transmit the PTRS and PUSCH operation configuration message 410 to the UE 402.

The UE 402 may receive and identify the PTRS and PUSCH operation configuration message 410 received from the base station 404. The UE 402 may be configured in accordance with the configuration indicated in the PTRS and PUSCH operation configuration message 410.

While the signaling chart 400 illustrates some example transmissions that may be transmitted between the UE 402 and the base station 404 in the illustrated embodiment, it should be understood that the transmissions may be different in other embodiments. For example, one or more of the transmissions illustrated may be omitted from the procedure and/or one or more additional transmissions may be included in the procedure in other embodiments.

Figure 5:
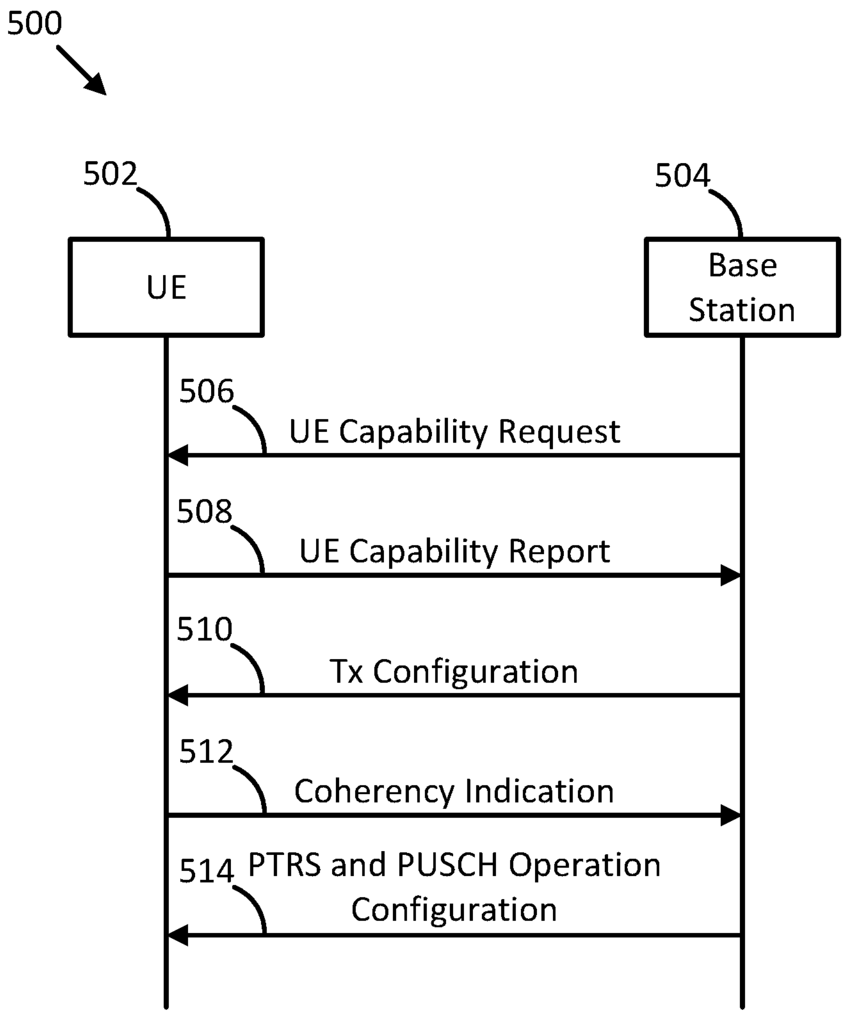
FIG. 5 illustrates another example signaling chart related to PTRS configuration in accordance with some embodiments.

FIG. 5 illustrates another example signaling chart 500 related to PTRS configuration in accordance with some embodiments. In particular, the signaling chart 500 illustrates example transmissions that may be exchanged between a UE 502 and a base station 504. The UE 502 may include one or more of the features of the UE 1300 (FIG. 13). The base station 504 may include one or more of the features of the gNB 1400 (FIG. 14).

The base station 504 may transmit a UE capability request 506 to the UE 502. The UE capability request 506 may request that the UE report the UE capability of the UE 502.

The UE 502 may receive and identify the UE capability request 506 received from the base station 504. The UE 502 may determine that the UE capability request 506 is requesting that the UE 502 report the UE capability of the UE 502. Based on the UE capability request 506, the UE 502 may generate a UE capability report message 508. The UE capability report message 508 may include a UE capability report. The UE capability report message 508 may include indications of one or more characteristics of the UE 502, as described further throughout this disclosure. The UE 502 may transmit the UE capability report message 508 to the base station 504.

The base station 504 may receive and identify the UE capability report message 508 received from the UE 502. Based on the UE capability report message 508, the base station 504 may determine a Tx configuration for the UE 502. The base station 504 may generate a Tx configuration message 510. The Tx configuration message 510 may include an indication of the Tx configuration for the UE 502. The base station 504 may transmit the Tx configuration message 510 to the UE 502.

The UE 502 may receive and identify the Tx configuration message 510 received from the base station 504. The UE 502 may determine the Tx configuration for the UE 502 based on the Tx configuration message 510. Based on the Tx configuration, the UE 502 may determine which coherency the UE 502 supports for the Tx configuration. The UE 502 may generate a coherency indication message 512 that indicates the one or more coherencies that the UE 502 supports for the Tx configuration. The UE 502 may transmit the coherency indication message 512 to the base station 504.

The base station 504 may receive and identify the coherency indication message 512 received from the UE 502. The base station 504 may determine a PTRS configuration for the UE 502 based on the information within the UE capability report message 508 and/or the information within the coherency indication message 512. For example, the base station 504 may determine the PTRS configuration for the UE 502 based on the characteristics for the UE 502 determined from the UE capability report message 508 and/or the one or more coherencies supported by the UE 502 for the TX configuration indicated in the coherence indication message 512. The base station 504 may generate a PTRS and PUSCH operation configuration message 514 that indicates the PTRS configuration for the UE 502, as described further throughout this disclosure. The base station 504 may transmit the PTRS and PUSCH operation configuration message 514 to the UE 502.

The UE 502 may receive and identify the PTRS and PUSCH operation configuration message 514 received from the base station 504. The UE 502 may be configured in accordance with the configuration indicated in the PTRS and PUSCH operation configuration message 514.

While the signaling chart 500 illustrates some example transmissions that may be transmitted between the UE 502 and the base station 504 in the illustrated embodiment, it should be understood that the transmissions may be different in other embodiments. For example, one or more of the transmissions illustrated may be omitted from the procedure and/or one or more additional transmissions may be included in the procedure in other embodiments. Further, while the Tx configuration message 510 and the coherency indication message 512 are illustrated as separate messages, the Tx configuration message 510 and/or the coherency indication message 512, or features thereof, may be part of a PTRS and PUSCH operation configuration in other embodiments.

To support 8 Tx operation for a UE, one or more of the transmissions within the signaling chart 400 and/or the signaling chart 500 may be modified from legacy transmissions. For example, a UE capability report message (such as the UE capability report message 408 (FIG. 4) and/or the UE capability report message 508 (FIG. 5)) may be modified from legacy UE capability report messages to support 8 TX operation in some embodiments. The UE capability report message may indicate characteristics of the UE that can be utilized for determining a PTRS configuration for the UE that supports 8 Tx operation. Following are some approaches for UE capability reporting that indicate characteristics may be included in a UE capability report message.

Approach 1.1: For nonCodebook based PUSCH operation, UE reports the number of Tx implicitly by reporting that UE supports nonCodebook based PUSCH operation and/or the maximum number of SRS resources for nonCodebook. For example, in a first approach for UE capability reporting, the UE capability report message (such as the UE capability report message 408 and/or the UE capability report message 508) may include an indication that the UE supports noncodebook based PUSCH operation and/or an indication of the maximum number of SRS resources for noncodebook operation of the UE. The UE may support up to eight SRS resources. Further, the UE may support up to eight Tx channels. The base station (such as the base station 404 (FIG. 4) and/or the base station 504 (FIG. 5)) may determine the number of Tx channels for the UE (such as the UE 402 (FIG. 4) and/or the UE 502 (FIG. 5)) based on the UE supporting noncodebook based PUSCH operation and/or the maximum number of SRS resources for noncodebook operation as indicated by the UE capability report message.

In some embodiments of the first approach, the UE capability report message may further include an indication of whether the SRS resources are to be configured within an SRS resource set or can be split among multiple SRS resource sets. In alternative 1: Per TRP, all the nonCodebook SRS resources have to be configured in the same SRS resource set. For example, the UE capability report message may indicate, per TRP, that all the noncodebook resources are to be configured in the same SRS resource set in alternative 1. In alternative 2: Per TRP, all the nonCodebook SRS resources can be configured in multiple SRS resource sets. For example, the UE capability report message may indicate, per TRP, that all the noncodebook SRS resources can be configured in multiple SRS resource sets in alternative 2.

Approach 1.2: For Codebook based PUSCH operation, UE reports the number of Tx implicitly by reporting UE supports Codebook based PUSCH operation and/or the maximum number of SRS ports that UE supports. For example, in a second approach for UE capability reporting, the UE capability report message (such as the UE capability report message 408 and/or the UE capability report message 508) may include an indication that the UE supports codebook based PUSCH operation and/or an indication of the maximum number of SRS ports that the UE supports. The base station (such as the base station 404 and/or the base station 504) may determine the number of TX channels for the UE (such as the UE 402 and/or the UE 502) based on the UE supporting codebook based PUSCH operation and/or the maximum number of SRS ports that the UE supports as indicated by the UE capability message. For example, the base station may determine that the UE supports up to eight Tx channels if the UE capability message indicates that the UE supports eight SRS ports. In the codebook based PUSCH, all the SRS ports may be transmitted in one resource.

In some embodiments of the second approach, the UE capability report message may further include an indication of whether the SRS ports are to be configured within one SRS resource or can be split among multiple SRS resources. In alternative 1: Per TRP, all the SRS ports have to be configured in one SRS resource. For example, the UE capability report message may indicate, per TRP, that all the SRS ports are to be configured in one SRS resource in alternative 1. In alternative 2: Per TRP, all the SRS ports can be configured in multiple SRS resources. For example, the UE capability report message may indicate, per TRP, that all the SRS ports can be configured in multiple SRS resources.

Approach 1.3: UE can report the number of PTRS ports that UE supports. The maximum value can be either 4 or 8. For example, in a third approach for UE capability reporting, the UE capability report message (such as the UE capability report message 408 and/or the UE capability report message 508) may include an indication of the number of PTRS ports that the UE requires. In embodiments, the maximum value of the number of PTRS ports that the UE requires indicated by the UE capability report message may be either 4 or 8.

This may be used to infer the UE antenna architecture. For example, the base station (such as the base station 404 and/or the base station 504) may determine a UE antenna architecture for the UE (such as the UE 402 and/or the UE 502). 4 PTRS ports implies "PartialCoherent4." For example, the base station may determine that the UE has a partialcoherent4 coherency (such as the presented by the fifth antenna arrangement 330 (FIG. 3) and/or the sixth antenna arrangement 344 (FIG. 3)) based on the number of PTRS ports indicated by the UE capability report message being four. Accordingly, the base station may determine that the UE presents four independent phase noise sources. 2 PTRS ports implies "PartialCoherent2." For example, the base station may determine that the UE has a partialcoherent2 coherency (such as presented by the third antenna arrangement 306 (FIG. 3) and/or the fourth antenna arrangement 316 (FIG. 3)) based on the number of PTRS ports indicated by the UE capability report message being two. Accordingly, the base station may determine that the UE presents two independent phase noise sources. The base station may determine that the UE has fullcoherent coherency (such as presented by the first antenna arrangement 302 (FIG. 3) and/or the second antenna arrangement 304 (FIG. 3)) based on the number of PTRS ports indicated by the UE capability report message being one. Accordingly, the base station may determine that the UE presents a single phase noise source.

Approach 1.4: For Codebook based PUSCH operation, UE can further report the supported coherency. For example, in a fourth approach for UE capability reporting, the UE capability report message (such as the UE capability report message 408 and/or the UE capability report message 508) may include an indication of one or more coherencies that the UE supports. In addition to "nonCoherent," and, "fullCoherent," UE can report different "partialCoherent," i.e., "partialCoherent2" or "partialCoherent4." For example, the UE capability report message may indicate that the UE (such as the UE 402 and/or the UE 502) supports noncoherent coherency, fullcoherent coherency, partialcoherent2 coherency, and/or partialcoherent4 coherency. UE is only allowed to report different "partialCoherent" when UE reports that UE supports 8 Tx UL operation. For example, the UE capability report message may include an indication of how many Tx UL channels that the UE supports in some embodiments. The UE capability report message may include an indication of partialcoherent2 coherency or partialcoherent4 coherency when the indication of how many Tx UL channels that the UE supports is eight Tx channels.

In some embodiments, the UE capability report message may include an indication of an antenna arrangement of the UE. When the indication is "fullCoherent," UE can report whether UE supports "1-a" (2×2) or "1-b" (1×4). For example, the UE capability report message may include an indication whether the antenna arrangement for the UE is in antenna arrangement 1-*a* (such as the first antenna arrangement 302) or in antenna arrangement 1-*b* (such as the second antenna arrangement 304) in instances where fullcoherent coherency is indicated. For "PartialCoherent2," UE can report whether UE supports "2-a" (vertical stacking) or "2-b" (Horizontal stacking). For example, the UE capability report message may include an indication whether the antenna arrangement for the UE is in antenna arrangement 2-*a* (such as the third antenna arrangement 306) or in antenna arrangement 2-*b* (such as the fourth antenna arrangement 316) in instances where partialcoherent2 coherency is indicated. For "PartialCoherent4," UE can report whether UE supports "3-a" (2×2) or "3-b" (1×4). For example, the UE capability report message may include an indication whether the antenna arrangement for the UE is in antenna arrangement 3-*a* (such as the fifth antenna arrangement 330) or in antenna arrangement 3-*b* (such as the sixth antenna arrangement 344) in instances where partialcoherent4 coherency is indicated.

Approach 1.5: For Codebook based PUSCH operation, if UE reports it supports 8 Tx operation, and the supported coherency, UE can further report when NW configures less number of Tx, e.g., what is supported coherency. For example, the UE capability report message 508 may include an indication that the UE (such as the UE 402 and/or the UE 502) supports eight Tx channels and/or an indication of the one or more coherencies supported by the UE. The base station (such as the base station 404 and/or the base station 504) may determine a number of Tx channels to configure the UE based on the indication that the UE supports eight Tx channels and/or the indication of the one or more coherencies supported by the UE. The base station may provide an indication of the number of Tx channels that are to be configured for the UE 502. In some embodiments, the number of Tx channels may be indicated in a Tx configuration message (such as the Tx configuration message 510 (FIG. 5)). In instances where the base station indicates that less than eight Tx channels are to be configured for the UE, the UE may determine one or more coherencies that are supported by the UE for the number of Tx channels to be configured. The UE may provide an indication of the one or more coherencies that are supported by the UE based on the number of Tx channels to be configured. In some embodiments, the one or more supported coherencies may be indicated in a coherency indication message (such as the coherency indication message 512 (FIG. 5)).

For 8 Tx, if UE supports "PartialCoherent4," when NW configures 2 Tx, whether UE supports "NonCoherent" or "fullCoherent." For example, the UE may indicate that the UE supports eight Tx channels and partialcoherent4 coherency for the eight Tx channels. Where the base station indicates that the UE is to be configured with two Tx channels, the UE may indicate that the UE supports noncoherent coherency or fullcoherent coherency. Accordingly, the coherency indication message may include an indication that noncoherent coherency or fullcoherent coherency in these instances. When NW configures 4 Tx, whether UE supports "NonCoherent" or "PartialCoherent." For example, the UE may indicate that the UE supports eight Tx channels and partialcoherent4 coherency for the eight Tx channels. Where the base station indicates that the UE is to be configured with four Tx channels in these instances the UE may indicate that the UE supports noncoherent coherency or partialcoherent coherency. Accordingly, the coherency indication message may include an indication that noncoherent coherency or partialcoherent coherency in these instances.

For 8 Tx, if UE supports "PartialCoherent2," when NW configures 2 Tx, whether UE supports "NonCoherent" or "fullCoherent." For example, the UE may indicate that the UE supports eight Tx channels and partialcoherent2 coherency for eight Tx channels. Where the base station indicates that the UE is to be configured with two Tx channels, the UE may indicate that the UE supports noncoherent coherency or fullcoherent coherency. Accordingly, the coherency indication message may include an indication that noncoherent coherency or fullcoherent coherency in these instances. When NW configures 4 Tx, whether UE supports "PartialCoherent" or "fullCoherent." For example, the UE may indicate that the UE supports eight Tx channels and partialcoherent2 coherency for eight Tx channels. Where the base station indicates that the UE is to be configured with four Tx channels, the UE may indicate that the UE supports partialcoherent coherency or fullcoherent coherency in these instances.

Network Configuration

To support eight Tx operation for a UE, a PTRS and PUSCH operation configuration message (such as the PTRS and PUSCH operation configuration message 410 (FIG. 4) and/or the PTRS and PUSCH operation configuration message 514 (FIG. 5)) may be modified from legacy PTRS and PUSCH operation configuration messages. The PTRS and PUSCH operation configuration message may indicate a PTRS configuration for a UE that supports eight Tx operation. Further, the configuration may depend on whether codebook or noncodebook usage is configured.

Approach 2.1: When NW configures UE with 8 Tx codebook PUSCH operation, NW can further configure the coherency. For example, a Tx configuration message (such as the Tx configuration message 510 (FIG. 5)) and/or a PTRS and PUSCH operation configuration message (such as the PTRS and PUSCH operation configuration message 410 (FIG. 4) and/or the PTRS and PUSCH operation configuration message 514 (FIG. 5)) may indicate that the UE (such as the UE 402 (FIG. 4) and/or the UE 502 (FIG. 5)) is to be configured with eight Tx codebook PUSCH operation and/or a coherency for which the UE is to be configured in a first approach to network configuration.

The following configurations are allowed. For example, the PTRS and PUSCH operation configuration message may indicate that the following configurations in some embodiments. If UE reports that UE supports "fullCoherent" 8 Tx operation, NW can configure "fullCoherent", "PartialCoherent2", "PartialCoherent4" or "nonCoherent." For example, if the UE indicates in a UE capability report message (such as the UE capability report message 408 (FIG. 4) and/or the UE capability report message 508 (FIG. 5)) and/or in a coherency indication message (such as the coherency indication message 512 (FIG. 5)) that the UE supports fullcoherent eight Tx operation, the base station (such as the base station 404 (FIG. 4) and/or the base station 504 (FIG. 5)) may indicate in the PTRS and PUSCH operation configuration message that the UE is to be configured with fullcoherent coherency, partialcoherent2 coherency, partialcoherent4 coherency, or noncoherent coherency.

If UE reports that UE supports "PartialCoherent2" 8 Tx operation, NW can configure "PartialCoherent2", "PartialCoherent4" or "nonCoherent." For example, if the UE indicates in a UE capability report message and/or a coherency indication message that the UE supports partialcoherent2 eight Tx operation, the base station may indicate in the PTRS and PUSCH operation configuration message that the UE is to be configured with partialcoherent2 coherency, partialcoherent4 coherency, or noncoherent coherency.

If UE reports that UE supports "PartialCoherent4" 8 Tx operation, NW can configure "PartialCoherent4" or "nonCoherent." For example, if the UE indicates in a UE capability report message and/or a coherency indication message that the UE supports partialcoherent4 eight Tx operation, the base station may indicate in the PTRS and PUSCH operation configuration message that the UE is to be configured with partialcoherent4 coherency or noncoherent coherency.

If UE reports that UE supports "nonCoherent" 8 Tx operation, NW can configure "nonCoherent" only. For example, if the UE indicates in a UE capability report message and/or a coherency indication message that the UE supports noncoherent eight Tx operation, the base station may indicate in the PTRS and PUSCH operation configuration message that the UE is to be configured with noncoherent coherency.

Approach 2.2: When UE supports 8 Tx operation, but, NW configures UE with 2 Tx codebook PUSCH operation, the following coherency configurations are allowed. For example, a UE capability report message (such as the UE capability report message 408 and/or the UE capability report message 508) may include an indication that the UE supports eight Tx operation in a second approach to network configuration. Further, in the second approach to network configuration, the network may configure the UE (such as the UE 402 and/or the UE 502) with two Tx codebook PUSCH operation by including an indication that the UE is to be configured with two Tx codebook PUSCH operation in a Tx configuration message (such as the Tx configuration message 510) and/or a PTRS and PUSCH operation configuration message (such as the PTRS and PUSCH operation configuration message 410 and/or the PTRS and PUSCH operation configuration message 514). In these instances, the following coherency configurations may be implemented.

If UE supports "fullCoherent" 8 Tx operation, NW can configure "fullCoherent" or "nonCoherent." For example, a UE capability report message (such as the UE capability report message 408 and/or the UE capability report message 508) and/or a coherency indication message (such as the coherency indication message 512) may include an indication that the UE supports fullcoherent coherency for eight Tx operation. In these instances, the network may determine to configure the UE for fullcoherent coherency or noncoherent coherency, in which case a PTRS and PUSCH operation configuration message (such as the PTRS and PUSCH operation configuration message 410 and/or the PTRS and PUSCH operation configuration message 514) may include an indication that the UE is to be configured for fullcoherent coherency or noncoherent coherency.

If UE supports "nonCoherent" 8 Tx operation, NW can configure "nonCoherent" only. For example, a UE capability report message (such as the UE capability report message 408 and/or the UE capability report message 508) and/or a coherency indication message (such as the coherency indication message 512) may include an indication that the UE supports noncoherent coherency for eight Tx operation. In these instances, the network may determine to configure the UE for noncoherent coherency, in which case a PTRS and PUSCH operation configuration message (such as the PTRS and PUSCH operation configuration message 410 and/or the PTRS and PUSCH operation configuration message 514) may include an indication that the UE is to be configured for noncoherent coherency.

If UE supports "PartialCoherent2" or "PartialCoherent4" 8 Tx operation, NW can configure "fullCoherent" or "nonCoherent." For example, a UE capability report message (such as the UE capability report message 408 and/or the UE capability report message 508) and/or a coherency indication message (such as the coherency indication message 512) may include an indication that the UE supports partialcoherent2 coherency or partialcoherent4 coherency for eight Tx operation. In these instances, the network may determine to configure the UE for fullcoherent coherency or noncoherent coherency, in which case a PTRS and PUSCH operation configuration message (such as the PTRS and PUSCH operation configuration message 410 and/or the PTRS and PUSCH operation configuration message 514) may include an indication that the UE is to be configured for fullcoherent coherency or noncoherent coherency. "fullCoherent" can be subject to additional UE capability reporting.

Approach 2.3: When UE supports 8 Tx operation, but, NW configures UE with 4 Tx codebook PUSCH operation, the following coherency configurations are allowed. For example, a UE capability report message (such as the UE capability report message 408 and/or the UE capability report message 508) may include an indication that the UE (such as the UE 402 and/or the UE 502) supports eight Tx operation in a third approach to network configuration. Further, in the third approach to network configuration, the network may configure the UE with four Tx codebook PUSCH operation by including an indication that the UE is to be configured with for Tx codebook PUSCH operation in a Tx configuration message (such as the Tx configuration message 510) and/or a PTRS and PUSCH operation configuration message (such as the PTRS and PUSCH operation configuration message 410 and/or the PTRS and PUSCH operation configuration message 514). In these instances, the following coherency configurations may be implemented.

If UE supports "fullCoherent" 8 Tx operation, NW can configure "fullCoherent" or "PartialCoherent" or "nonCoherent." For example, a UE capability report message (such as the UE capability report message 408 and/or the UE capability report message 508) and/or a coherency indication message (such as the coherency indication message 512) may include an indication that the UE supports fullcoherent coherency for eight Tx operation. In these instances, the network may determine to configure the UE for fullcoherent coherency, partialcoherent coherency, or noncoherent coherency, in which case a PTRS and PUSCH operation configuration message (such as the PTRS and PUSCH operation configuration message 410 and/or the PTRS and PUSCH operation configuration message 514) may include an indication that the UE is to be configured for fullcoherent coherency, partialcoherent coherency, or noncoherent coherency.

If UE supports "nonCoherent" 8 Tx operation, NW can configure "nonCoherent" only. For example, a UE capability report message (such as the UE capability report message 408 and/or the UE capability report message 508) and/or a coherency indication message (such as the coherency indication message 512) may include an indication that the UE supports noncoherent coherency for eight Tx operation. In these instances, the network may determine to configure the UE for noncoherent coherency, in which case a PTRS and PUSCH operation configuration message (such as the PTRS and PUSCH operation configuration message 410 and/or the PTRS and PUSCH operation configuration message 514) may include an indication that the UE is to be configured for noncoherent coherency.

If UE supports "PartialCoherent2" 8 Tx operation, NW can configure "fullCoherent" or "PartialCoherent" or "nonCoherent." For example, a UE capability report message (such as the UE capability report message 408 and/or the UE capability report message 508) and/or a coherency indication message (such as the coherency indication message 512) may include an indication that the UE supports partialcoherent2 coherency for eight Tx operation. In these instances, the network may determine to configure the UE for fullcoherent coherency, partialcoherent coherency, or noncoherent coherency, in which case a PTRS and PUSCH operation configuration message (such as the PTRS and PUSCH operation configuration message 410 and/or the PTRS and PUSCH operation configuration message 514) may include an indication that the UE is to be configured for fullcoherent coherency, partialcoherent coherency, or noncoherent coherency. "fullCoherent" can be subject to additional UE capability reporting.

If UE supports "PartialCoherent4" 8 Tx operation, NW can configure "PartialCoherent" or "nonCoherent." For example, a UE capability report message (such as the UE capability report message 408 and/or the UE capability report message 508) and/or a coherency indication message (such as the coherency indication message 512) may include an indication that the UE supports partialcoherent4 coherency for eight Tx operation. In these instances, the network may determine to configure the UE for partialcoherent coherency or noncoherent coherency, in which case a PTRS and PUSCH operation configuration message (such as the PTRS and PUSCH operation configuration message 410 and/or the PTRS and PUSCH operation configuration message 514) may include an indication that the UE is to be configured for partialcoherent coherency or noncoherent coherency. "PartialCoherent" can be subject to additional UE capability reporting.

Approach 2.4: When NW configures 8 Tx operation, NW can configure more than 2 PTRS ports. The maximum number of PTRS ports can be 4. For example, a Tx configuration message (such as the Tx configuration message 510) and/or a PTRS and PUSCH operation configuration message (such as the PTRS and PUSCH operation configuration message 410 and/or the PTRS and PUSCH operation configuration message 514) may include an indication that a UE (such as the UE 402 and/or the UE 502) is to be configured with eight Tx operations and more than two PTRS ports. The maximum number of PTRS ports for configuration of the UE that can be indicated in the Tx configuration message and/or the PTRS and PUSCH operation configuration message may be four PTRS ports.

In some embodiments, the Tx configuration message and/or the PTRS and PUSCH operation configuration message may include a PTRS-uplinkconfig information element. FIG. 6 illustrates an example PTRS-uplinkconfig information element 600 in accordance with some embodiments. As shown in the illustrated embodiment, the PTRS-uplinkconfig information element 600 can have a max number of ports value 602 of four, as illustrated by enumerated n1, n2, n3, and n4. While the PTRS-uplinkconfig information element 600 includes other elements (such as the frequencyDensity, timeDensity, resourceElementOffset, and ptrs-Power) in the illustrated embodiment, it should be understood that the PTRS-uplinkconfig information element 600 may include different elements with the max number of ports value 602 in other embodiments.

NW configures 8 Tx operation by either configure SRS resource set, SRS-ResourceSet, with usage of "codebook" with 8 ports SRS resource, or configure SRS resource set with usage of "nonCodebook" with 8 SRS resources in the set, each SRS resource contains single port. For example, the Tx configuration message and/or the PTRS and PUSCH operation configuration message may include an indication that an SRS resource set is to be configured with usage of codebook with eight port SRS resources in some instances. In other instances, the Tx configuration message and/or the PTRS and PUSCH operation message may include an indication that an SRS resource set is to be configured with usage of noncodebook with eight SRS resources in a set, where each SRS resource may include a single port.

NW can only configure maximum 4 port PTRS under one or combination of the following conditions. NW configures 8 Tx operation and/or, for codebook operation, NW configures coherency of "nonCoherent" or "PartialCoherent4" [or "PartialCoherent2"]. For example, the Tx configuration message and/or the PTRS and PUSCH operation configuration message may include an indication that the UE is to be configured with eight Tx operation and/or, for codebook operation, an indication that noncoherent coherency, partialcoherent4 coherency, or partialcoherent2 coherency is to be configured for the UE. Further, the Tx configuration message and/or the PTRS and PUSCH operation configuration message is to be configured with a maximum of four port PTRS, such as being configured for four PTRS ports, two PTRS ports, or one PTRS port.

NonCodebook PTRS Port Index

To support eight Tx operation for a UE, certain noncodebook PTRS port index may be implemented. For example, a PTRS and PUSCH operation configuration message (such as the PTRS and PUSCH operation configuration message 410 (FIG. 4) and/or the PTRS and PUSCH operation configuration message 514 (FIG. 5)) may be modified from legacy PTRS and PUSCH operation configuration messages to support certain noncodebook PTRS port index configuration.

For nonCodebook, when SRS-ResourceSet is configured with usage of "nonCodebook." For example, a UE (such as the UE 402 (FIG. 4) and/or the UE 502 (FIG. 5)) may be configured with usage of noncodebook. The UE may be configured with usage of noncodebook by radio resource control (RRC) for one or two SRS resource sets. For each SRS-Resource in the SRS-ResourceSet, NW can configure PTRS port index, which is used for the PTRS to DMRS association indication. For example, a PTRS and PUSCH operation configuration message (such as the PTRS and PUSCH operation configuration message 410 and/or the PTRS and PUSCH operation configuration message 514) may include an indication that the UE is to be configured with a PTRS port for each SRS-Resource in the SRS-ResourceSet. A PTRS to DMRS association indication may be determined based on the PTRS port for each SRS-Resource. For each SRS-Resource, NW can only configure one of the maximum two PTRS ports. For example, the PTRS and PUSCH operation configuration message may include an indication of one PTRS port to be configured of the maximum two PTRS ports.

FIG. 7 illustrates an example SRS resource information element 700 in accordance with some embodiments. The SRS resource information element 700 includes a PTRS port index element 702 that may be included in the PTRS and PUSCH operation configuration message for configuration of the PTRS ports. The PTRS port index element 702 indicates that there are two port indexes that may be configured as indicated by n0 and n1.

Approach 3.1: For each SRS-Resource in the SRS-ResourceSet configured with usage of "nonCodebook," NW can configure PTRS port index from one of the maximum 4 PTRS ports. For example, a PTRS and PUSCH operation configuration message (such as the PTRS and PUSCH operation configuration message 410 and/or the PTRS and PUSCH operation configuration message 514) may include an indication of one or more SRS resources to be configured in an SRS resource set in a first approach of the noncodebook PRS port index. Further, the PTRS and PUSCH operation may indicate which of the SRS resources are to be configured with usage of noncodebook and a PTRS port index from the four PTRS ports.

NW choosing one of the maximum four PTRS ports is only allowed under one or combination of the following conditions. NW configures 8 Tx operation. For nonCodebook operation, UE operation in coherency mode of "nonCoherent." For nonCodebook operation, UE operation in coherency mode of "PartialCoherent4." [For nonCodebook operation, UE operation in coherency mode of "PartialCoherent2"]. For example, the PTRS and PUSCH operation configuration message may include one of the PTRS ports of the four PTRS ports if the PTRS and PUSCH configuration message further include an indication that the UE is to be configured with eight Tx operation, an indication that the UE is to be configured with coherency mode of noncoherent coherency, an indication that the UE is to be configured with coherency mode of partialcoherent4 coherency, an indication that the UE is to be configured with coherency mode of partialcoherent2 coherency, or some combination thereof.

Approach 3.2: When NW configure 8 Tx nonCodebook operation, for each SRS-Resource in the SRS-ResourceSet configured with usage of "nonCodebook", following restriction can be considered regarding the configuration of PTRS port index. For example, a Tx configuration message (such as the Tx configuration message 510 (FIG. 5)) and/or a PTRS and PUSCH operation configuration message (such as the PTRS and PUSCH operation configuration message 410 and/or the PTRS and PUSCH operation configuration message 514) may include an indication that the UE is to be configured with eight Tx noncodebook operation, the following features can be considered regarding the configuration of PTRS port index for each SRS resource in an SRS resource set configured with usage of noncodebook.

For "fullCoherent" operation, all the SRS resources have to be configured with the same PTRS port index or only one SRS resource can be configured with PTRS port index. For example, the PTRS and PUSCH operation configuration message may include an indication of a PTRS port index to be configured for the SRS resources for fullcoherent coherency operation.

For "PartialCoherent2" operation, up to 2 different PTRS port indexes can be configured for different SRS resources. For example, the PTRS and PUSCH operation configuration message may include an indication of up to two different PTRS port indexes to be configured for different SRS resources for partialcoherent2 coherency operation. For each PTRS port index, it should be configured to be associated with 4 SRS resources or only one SRS resource. For example, the PTRS and PUSCH operation configuration message may include an indication of four SRS resources or one SRS resource to be configured for each PTRS port index for partialcoherent2 coherency operation.

For "PartialCoherent4" operation, up to 4 different PTRS port indexes can be configured for different SRS resources. For example, the PTRS and PUSCH operation configuration message may include an indication of up to four different PTRS port indexes to be configured for different SRS resources for partialcoherent4 coherency operation. For each PTRS port index, it should be configured to be associated with 2 SRS resources or only one SRS resource. For example, the PTRS and PUSCH operation configuration message may include an indication of two SRS resources or one SRS resource to be configured for each PTRS port index for partialcoherent4 coherency operation.

For "nonCoherent" operation, it follows either the "PartialCoherent4" operation or "PartialCoherent2" operation. For example, a PTRS and PUSCH operation configuration message for noncoherent coherency operation may include one or more of the features of the PTRS and PUSCH operation configuration message for the partialcoherent4 coherency operation or the PTRS and PUSCH operation configuration message for the partialcoherent2 coherency operation in instances.

Figure 8:
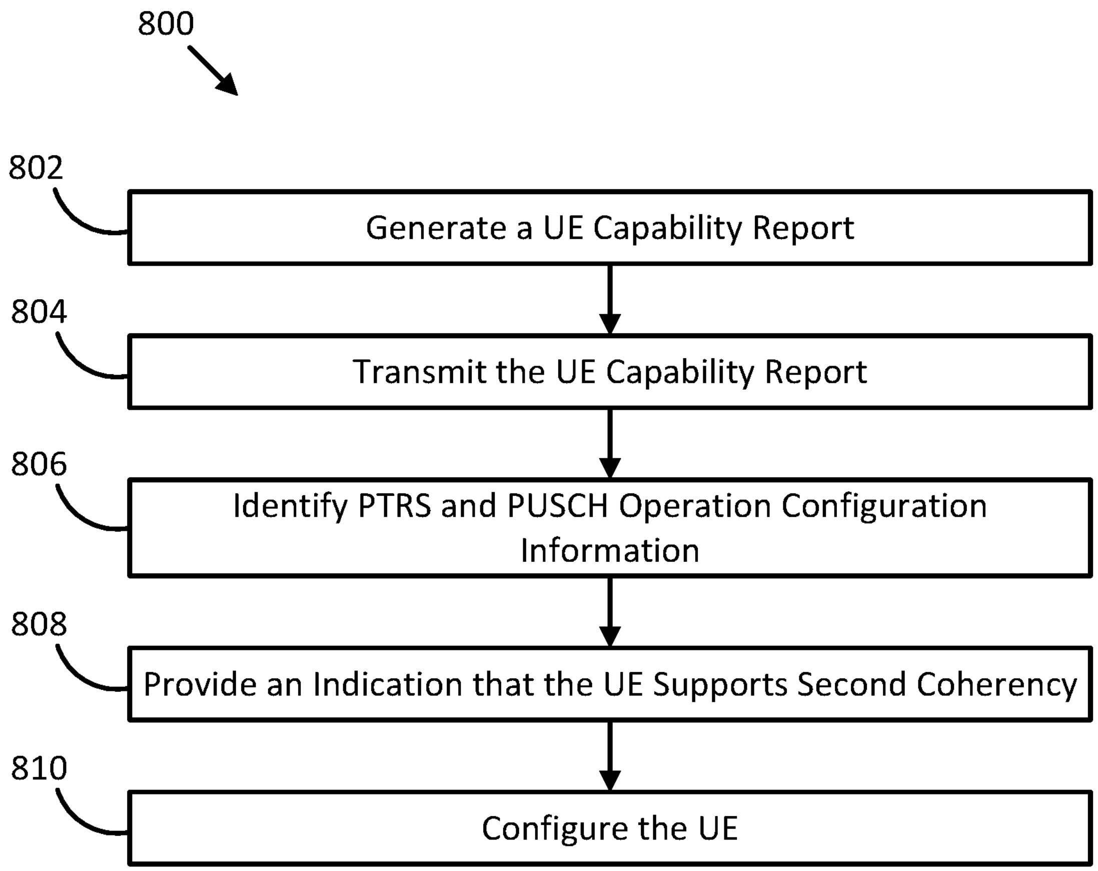
FIG. 8 illustrates an example procedure in accordance with some embodiments.

FIG. 8 illustrates an example procedure 800 in accordance with some embodiments. The procedure 800 may be performed by a UE, such as the UE 402 (FIG. 4), the UE 502 (FIG. 5), and/or the UE 1300 (FIG. 13).

The procedure 800 may include generating a UE capability report in 802. For example, the UE may generate a UE capability report. The UE capability report may indicate characteristics related to antennas of the UE for PTRS signaling. The UE capability report may include one or more of the UE capability report messages described throughout this disclosure. Further, a UE capability report message may include one or more of the features of the UE capability report.

In some embodiments, the characteristics related to the antennas of the UE may include that the UE supports nonCodebook based PUSCH operation and a maximum number of SRS resources supported by the UE. Further, the characteristics related to the antennas of the UE may include that all noncodebook SRS resources have to be configured in a same SRS resource set or that the noncodebook SRS resources can be configured in multiple SRS resource sets in some of these embodiments.

In some embodiments, the characteristics related to the antennas of the UE may include that the UE supports codebook based PUSCH operation and a maximum number of sounding reference (SRS) ports supported by the UE. Further, the characteristics related to the antennas of the UE may include that all SRS ports have to be configured in one SRS resource or that the SRS ports can be configured in multiple SRS resources in some of these embodiments.

In some embodiments, the characteristics related to the antennas of the UE may include a number of PTRS ports supported by the UE.

In some embodiments, the characteristics related to the antennas of the UE may include type of coherency supported by the UE, the type of coherency comprising full-coherent coherency, non-coherent coherency, or partial-coherent coherency. Further, the characteristics related to the antennas of the UE may include an indication of an arrangement of the antennas of the UE in some of these embodiments.

In some embodiments, the characteristics related to the antennas may include that the UE supports eight Tx operation and type of coherency supported by the UE. Further, the coherency may be a first coherency in some of these embodiments. In some of these embodiments, the first coherency may comprise second partial-coherent or first partial-coherent.

The procedure 800 may include transmitting the UE capability report in 804. For example, the UE may transmit the UE capability report to a base station.

The procedure 800 may include identifying PTRS and PUSCH operation configuration information in 806. For example, the UE may identify PTRS and PUSCH operation configuration information received from the base station. The PTRS and PUSCH operation configuration information may be based on the UE capability report. The PTRS and PUSCH operation configuration information may include the information, or a portion thereof, described in the PTRS and PUSCH operation configuration messages described throughout this disclosure.

In some embodiments, the PTRS and PUSCH operation configuration information may indicate that the UE is to be configured with two Tx. In other embodiments, the PTRS and PUSCH operation configuration information may indicate that the UE is to be configured with four Tx.

The procedure 800 may include providing an indication that the UE supports second coherency in 808. For example, the UE may provide an indication that the UE supports second coherency. In some embodiments, the indication may indicate that the UE supports second coherency of non-coherent or full-coherent for two Tx. In other embodiments, the indication may indicate that the UE supports second coherency of non-coherent or partial-coherent for four Tx. In other embodiments, the indication may indicate that the UE supports second coherency of partial-coherent or full-coherent. In some embodiments, 808 may be omitted.

The procedure 800 may include configuring the UE in 810. For example, the UE may configure the UE in accordance with the PTRS and PUSCH operation configuration information.

While FIG. 8 may imply an order of operations of the procedure 800, it should be understood that the operations may be different in other embodiments and/or one or more of the operations may be performed concurrently in other embodiments. Further, it should be understood that one or more of the operations may be omitted and/or one or more additional operation may be added to the procedure 800 in other embodiments.

Figure 9:
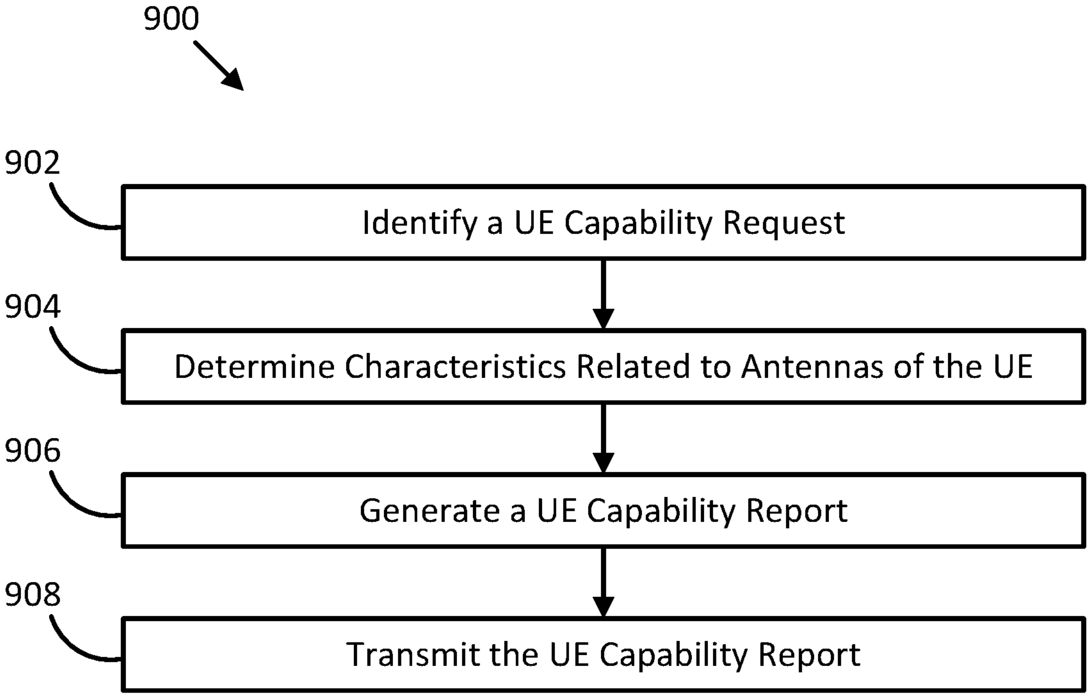
FIG. 9 illustrates another example procedure in accordance with some embodiments.

FIG. 9 illustrates another example procedure 900 in accordance with some embodiments. The procedure 900 may be executed by a UE, such as the UE 402 (FIG. 4), the UE 502 (FIG. 5), and/or the UE 1300 (FIG. 13).

The procedure 900 may include identifying a UE capability request in 902. For example, the UE may identify a UE capability request received from a base station.

The procedure 900 may include determining characteristics related to antennas of the UE in 904. For example, the UE may determine characteristics related to antennas of the UE to be utilized for determining a configuration of the UE for PTRS signaling.

In some embodiments, the determined characteristics related to the antennas may include that the UE supports nonCodebook based PUSCH operation and a maximum number of SRS resources supported by the UE. The determined characteristics related to the antennas may include that the UE supports codebook based PUSCH operation and a maximum number of SRS ports supported by the UE in some embodiments. In some embodiments, the determined characteristics related to the antennas may include a number of PTRS ports supported by the UE. The determined characteristics may include type of coherency supported by the UE in some embodiments.

The procedure 900 may include generating a UE capability report in 906. For example, the UE may generate a UE capability report that indicates the determined characteristics related to the antennas. In some embodiments, the UE capability report generated may comprise a UE capability report message.

The procedure 900 may include transmitting the UE capability report in 908. For example, the UE may transmit the UE capability report to the base station.

While FIG. 9 may imply an order of operations of the procedure 900, it should be understood that the operations may be different in other embodiments and/or one or more of the operations may be performed concurrently in other embodiments. Further, it should be understood that one or more of the operations may be omitted and/or one or more additional operation may be added to the procedure 900 in other embodiments.

Figure 10:
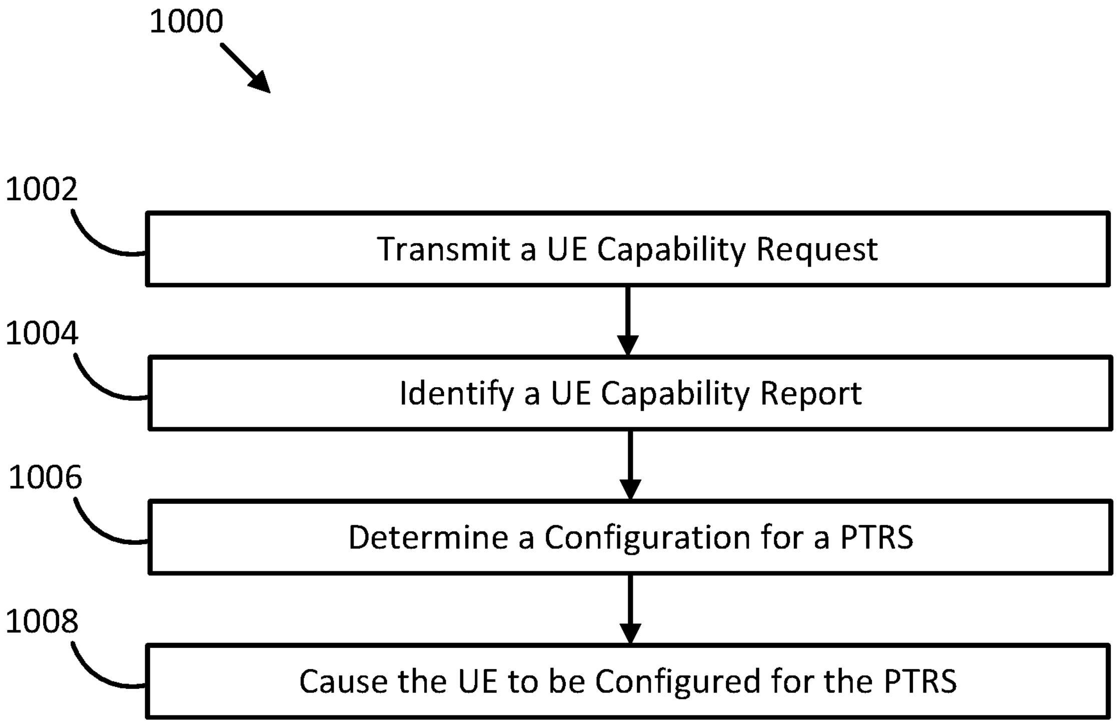
FIG. 10 illustrates another example procedure in accordance with some embodiments.

FIG. 10 illustrates another example procedure 1000 in accordance with some embodiments. The procedure 1000 may be performed by a base station, such as the base station 404 (FIG. 4), the base station 504 (FIG. 5), and/or the gNB 1400 (FIG. 14).

The procedure 1000 may include transmitting a UE capability request in 1002. For example, the base station may transmit a UE capability request to a UE. The UE capability request may include one or more of the features of the UE capability requests described throughout this disclosure.

The procedure 1000 may include identifying a UE capability report in 1004. For example, the base station may identify a UE capability report received from the UE. The UE capability report may indicate characteristics related to antennas of the UE.

In some embodiments, the characteristics related to the antennas may include that the UE supports nonCodebook based PUSCH operation and a maximum number of SRS resources. The characteristics related to the antennas may include that the UE supports codebook based PUSCH operation and a maximum number of SRS ports supported by the UE in some embodiments.

The procedure 1000 may include determining a configuration for a PTRS in 1006. For example, the base station may determine a configuration for a PTRS based on the characteristics related to the antennas.

The procedure 1000 may include causing the UE to be configured for the PTRS in 1008. For example, the base station may cause the UE to be configured for the PTRS in accordance with the determined configuration.

While FIG. 10 may imply an order of operations of the procedure 1000, it should be understood that the operations may be different in other embodiments and/or one or more of the operations may be performed concurrently in other embodiments. Further, it should be understood that one or more of the operations may be omitted and/or one or more additional operation may be added to the procedure 1000 in other embodiments.

Figure 11:
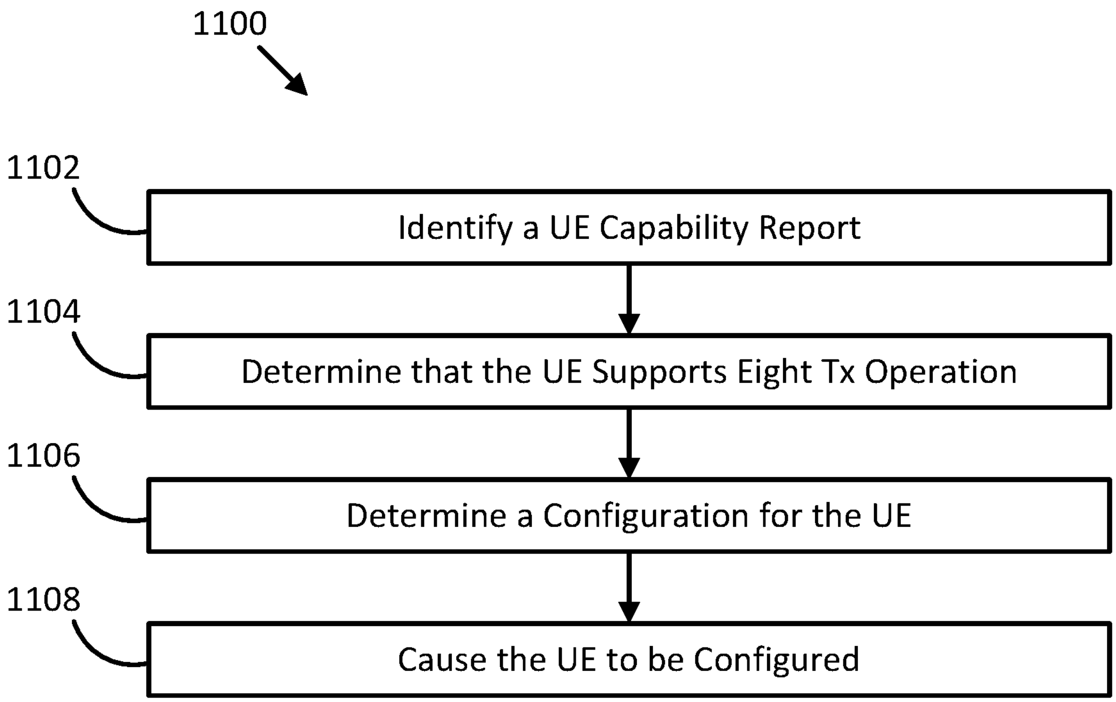
FIG. 11 illustrates another procedure in accordance with some embodiments.

FIG. 11 illustrates another procedure 1100 in accordance with some embodiments. The procedure 1100 may be performed by a base station, such as the base station 404 (FIG. 4), the base station 504 (FIG. 5), and/or the gNB 1400 (FIG. 14).

The procedure 1100 may include identifying a UE capability report in 1102. For example, the base station may identify a UE capability report received from a UE. The UE capability report may include one or more of the features of the UE capability report messages described throughout the disclosure.

In some embodiments, the UE capability report may indicate a maximum coherency that the UE supports for eight Tx operation. The UE capability report may indicate that the UE supports full-coherent eight Tx operation in some embodiments. In some embodiments, the UE capability report may indicate that the UE supports full-coherent eight Tx operation, first partial-coherent eight Tx operation, or second partial-coherent eight Tx operation. The UE capability report may indicate that the UE supports non-coherent eight Tx operation in some embodiments. In some embodiments, the UE capability report may indicate that the UE supports full-coherent eight Tx operation or first partial-coherent eight Tx operation. The UE capability report indicates that the UE supports second partial-coherent eight Tx operation in some embodiments.

The procedure 1100 may include determining that the UE supports eight Tx operation in 1104. For example, the base station may determine that the UE supports eight Tx operation related to PTRS signaling based on the UE capability report.

The procedure 1100 may include determining a configuration for the UE in 1106. For example, the base station may determine a configuration for the UE for the PTRS signaling based on the UE supporting the eight Tx operation.

In some embodiments, the configuration may include eight Tx codebook PUSCH operation for the UE and a coherency for the UE. Further, in some of these embodiments, the UE capability report may indicate the maximum coherency that the UE supports for eight Tx operation and the configuration may include the maximum coherency or a lesser coherency for the UE. The lesser coherency may be a coherency that has more phase noise sources than the maximum coherency.

In some embodiments, the configuration may include two Tx codebook PUSCH operation for the UE and a coherency for the UE. In some of these embodiments, the UE capability report may indicate that the UE supports full-coherent eight Tx operation, first partial-coherent eight Tx operation, or second partial-coherent eight Tx operation, and wherein the coherency for the UE of the configuration may comprise full-coherent coherency or non-coherent coherency. In some of these embodiments, the UE capability report may indicate that the UE supports non-coherent eight Tx operation, and wherein the coherency for the UE of the configuration may comprise non-coherent coherency.

In some embodiments, the configuration may include four Tx codebook PUSCH operation for the UE and a coherency for the UE. In some of these embodiments, the UE capability report may indicate that the UE supports full-coherent eight Tx operation or first partial-coherent eight Tx operation and the coherency for the UE of the configuration may comprise full-coherent coherency, partial-coherent coherency, or non-coherent coherency. In some of these embodiments, the UE capability report may indicate that the UE supports second partial-coherent eight Tx operation and the coherency for the UE of the configuration may comprise partial-coherent coherency or non-coherent coherency. In some of these embodiments, the UE capability report may indicate that the UE supports non-coherent eight Tx operation and the coherency for the UE of the configuration may comprise non-coherent coherency.

In some embodiments, the configuration may include eight Tx operation for the UE and more than two PTRS ports. In some of these embodiments, the more than two PTRS ports for the UE may comprise four PTRS ports for the UE and the configuration may comprise a non-coherent coherency for the UE, a second partial-coherent coherency for the UE, or a first partial-coherent coherency for the UE.

In some embodiments, the configuration may include an SRS resource set configured with usage of noncodebook and corresponding PTRS port indexes for each SRS resource for the SRS resource set. In some of these embodiments, the corresponding PTRS port indexes may comprise a single PTRS port from four PTRS port indexes corresponding to the UE for each SRS resource.

In some embodiments, the configuration may include eight Tx noncodebook operation for the UE, full-coherent operation for the UE, an SRS resource set configured with usage of noncodebook for the UE, and a PTRS port index for SRS resource within the SRS resource set. The configuration may include eight Tx noncodebook operation for the UE, first partial-coherent operation for the UE or non-coherent operation for the UE, an SRS resource set configured with usage of noncodebook for the UE, and two different PTRS port indexes for SRS resources within the SRS resource set in some embodiments, wherein each PTRS port index of the two different PTRS port indexes is to be associated with four SRS resources. In some embodiments, the configuration may include eight Tx noncodebook operation for the UE, second partial-coherent operation for the UE or non-coherent operation for the UE, an SRS resource set configured with usage of noncodebook for the UE, and four different PTRS port indexes for SRS resources with the SRS resource set, wherein each PTRS port index of the four different PTRS port indexes is to be associated with two SRS resources.

The procedure 1100 may cause the UE to be configured in 1108. For example, the base station may cause the UE to be configured in accordance with the determined configuration. The base station may cause the UE to be configured by transmitting Tx configuration message (such as the Tx configuration message 510 (FIG. 5)) and/or a PTRS and PUSCH operation configuration message (such as the PTRS and PUSCH operation configuration message 410 (FIG. 4) and/or the PTRS and PUSCH operation configuration message 514 (FIG. 5)) in some embodiments.

In some embodiments, causing the UE to be configured in accordance with the determined configuration may include causing a SRS resource set to be configured with usage of codebook with eight ports SRS resource or causing the SRS resource set to be configured with usage of noncodebook with eight SRS resources in the SRS resource set, wherein each SRS resource of the eight SRS resources includes a single port While FIG. 11 may imply an order of operations of the procedure 1100, it should be understood that the operations may be different in other embodiments and/or one or more of the operations may be performed concurrently in other embodiments. Further, it should be understood that one or more of the operations may be omitted and/or one or more additional operation may be added to the procedure 1100 in other embodiments.

Figure 12:
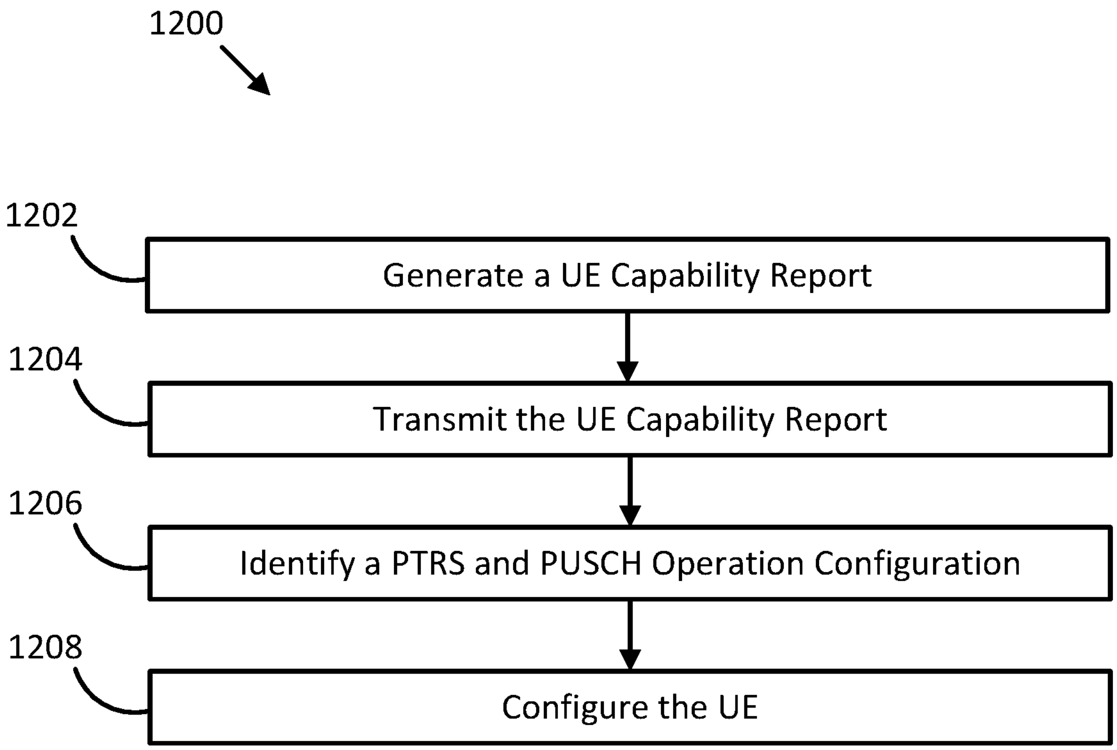
FIG. 12 illustrates another procedure in accordance with some embodiments.

FIG. 12 illustrates another procedure 1200 in accordance with some embodiments. The procedure 1200 may be performed by a UE, such as the UE 402 (FIG. 4), the UE 502 (FIG. 5), and/or the UE 1300 (FIG. 13).

The procedure 1200 may include generating a UE capability report in 1202. For example, the UE may generate a UE capability report that indicates that the UE supports eight Tx operation related to PTRS signaling. The UE capability report may include one or more of the features of the UE capability report messages described throughout this disclosure in some embodiments. In some embodiments, the UE capability report may indicate a first coherency supported by the UE.

The procedure 1200 may include transmitting the UE capability report in 1204. For example, the UE may transmit the UE capability report to a base station. The UE may transmit the UE capability report in a UE capability report message in some embodiments, such as any of the UE capability report messages described throughout this disclosure.

The procedure 1200 may include identifying a PTRS and PUSCH operation configuration in 1206. For example, the UE may identify a PTRS and PUSCH operation configuration from the base station. The PTRS and PUSCH operation configuration may be determined based on the UE supporting eight Tx operation. The PTRS and PUSCH operation configuration may include one or more of the features of the PTRS and PUSCH operation configuration messages described throughout this disclosure in some embodiments.

In embodiments where the UE capability report indicates a first coherency, the PTRS and PUSCH operation configuration may indicate an eight Tx codebook PUSCH operation and a second coherency. The second coherency may be a same coherency as or a lesser coherency than the first coherency. The lesser coherency may be a coherency that has more phase noise sources than the first coherency.

In some embodiments, the PTRS and PUSCH operation configuration may indicate two Tx codebook PUSCH operation and a coherency. The PTRS and PUSCH operation configuration may indicate four Tx codebook PUSCH operation and a coherency in some embodiments. In some embodiments, the PTRS and PUSCH operation configuration may indicate the eight Tx operation and more than two PTRS ports. The PTRS and PUSCH operation configuration may indicate an SRS resource set to be configured with usage of noncodebook and corresponding PTRS port indexes for each SRS resource within the SRS resource set.

The procedure 1200 may include configuring the UE in 1208. For example, the UE may configure the UE in accordance with the PTRS and PUSCH operation configuration.

In instances where the PTRS and PUSCH operation configuration indicates an eight Tx codebook PUSCH operation and a second coherency, configuring the UE may include configuring the UE with the eight Tx codebook PUSCH operation and the second coherency.

In instances where the PTRS and PUSCH operation configuration indicates two Tx codebook PUSCH operation and a coherency, configuring the UE may include configuring the UE with two Tx codebook PUSCH operation and the coherency.

In instances where the PTRS and PUSCH operation configuration indicates four Tx codebook PUSCH operation and a coherency, configuring the UE may include configuring the UE with the two Tx codebook PUSCH operation and the coherency.

In instances where the PTRS and PUSCH operation configuration indicates the eight Tx operation and more than two PTRS ports, configuring the UE may include configuring the UE with the eight Tx operation and the more than two PTRS ports.

In instances where the PTRS and PUSCH operation configuration indicates an SRS resource set to be configured with usage of noncodebook and corresponding PTRS port indexes for each SRS resource within the SRS resource set, configuring the UE may include configuring the UE with the SRS resource set with each SRS resource of the SRS resource set configured with the corresponding PTRS port indexes.

While FIG. 12 may imply an order of operations of the procedure 1200, it should be understood that the operations may be different in other embodiments and/or one or more of the operations may be performed concurrently in other embodiments. Further, it should be understood that one or more of the operations may be omitted and/or one or more additional operation may be added to the procedure 1200 in other embodiments.

As mentioned above, one or more of the approaches discussed herein may be utilized to support eight Tx operation. For example, the approaches may be utilized to configure UEs that support eight Tx channels. The approaches may be utilized in combination or may be utilized separately with other approaches.

FIG. 13 illustrates an example UE 1300 in accordance with some embodiments. The UE 1300 may be any mobile or non-mobile computing device, such as, for example, mobile phones, computers, tablets, industrial wireless sensors (for example, microphones, carbon dioxide sensors, pressure sensors, humidity sensors, thermometers, motion sensors, accelerometers, laser scanners, fluid level sensors, inventory sensors, electric voltage/current meters, actuators, etc.), video surveillance/monitoring devices (for example, cameras, video cameras, etc.), wearable devices (for example, a smart watch), relaxed-IoT devices. In some embodiments, the UE 1300 may be a RedCap UE or NR-Light UE.

The UE 1300 may include processors 1304, RF interface circuitry 1308, memory/storage 1312, user interface 1316, sensors 1320, driver circuitry 1322, power management integrated circuit (PMIC) 1324, antenna structure 1326, and battery 1328. The components of the UE 1300 may be implemented as integrated circuits (ICs), portions thereof, discrete electronic devices, or other modules, logic, hardware, software, firmware, or a combination thereof. The block diagram of FIG. 13 is intended to show a high-level view of some of the components of the UE 1300. However, some of the components shown may be omitted, additional components may be present, and different arrangement of the components shown may occur in other implementations.

The components of the UE 1300 may be coupled with various other components over one or more interconnects 1332, which may represent any type of interface, input/output, bus (local, system, or expansion), transmission line, trace, optical connection, etc. that allows various circuit components (on common or different chips or chipsets) to interact with one another.

The processors 1304 may include processor circuitry such as, for example, baseband processor circuitry (BB) 1304A, central processor unit circuitry (CPU) 1304B, and graphics processor unit circuitry (GPU) 1304C. The processors 1304 may include any type of circuitry or processor circuitry that executes or otherwise operates computer-executable instructions, such as program code, software modules, or functional processes from memory/storage 1312 to cause the UE 1300 to perform operations as described herein.

In some embodiments, the baseband processor circuitry 1304A may access a communication protocol stack 1336 in the memory/storage 1312 to communicate over a 3GPP compatible network. In general, the baseband processor circuitry 1304A may access the communication protocol stack to: perform user plane functions at a PHY layer, MAC layer, RLC layer, PDCP layer, SDAP layer, and PDU layer; and perform control plane functions at a PHY layer, MAC layer, RLC layer, PDCP layer, RRC layer, and a non-access stratum layer. In some embodiments, the PHY layer operations may additionally/alternatively be performed by the components of the RF interface circuitry 1308.

The baseband processor circuitry 1304A may generate or process baseband signals or waveforms that carry information in 3GPP-compatible networks. In some embodiments, the waveforms for NR may be based cyclic prefix OFDM (CP-OFDM) in the uplink or downlink, and discrete Fourier transform spread OFDM (DFT-S-OFDM) in the uplink.

The memory/storage 1312 may include one or more non-transitory, computer-readable media that includes instructions (for example, communication protocol stack 1336) that may be executed by one or more of the processors 1304 to cause the UE 1300 to perform various operations described herein. The memory/storage 1312 include any type of volatile or non-volatile memory that may be distributed throughout the UE 1300. In some embodiments, some of the memory/storage 1312 may be located on the processors 1304 themselves (for example, L1 and L2 cache), while other memory/storage 1312 is external to the processors 1304 but accessible thereto via a memory interface. The memory/storage 1312 may include any suitable volatile or non-volatile memory such as, but not limited to, dynamic random access memory (DRAM), static random access memory (SRAM), eraseable programmable read only memory (EPROM), electrically eraseable programmable read only memory (EEPROM), Flash memory, solid-state memory, or any other type of memory device technology.

The RF interface circuitry 1308 may include transceiver circuitry and radio frequency front module (RFEM) that allows the UE 1300 to communicate with other devices over a radio access network. The RF interface circuitry 1308 may include various elements arranged in transmit or receive paths. These elements may include, for example, switches, mixers, amplifiers, filters, synthesizer circuitry, control circuitry, etc.

In the receive path, the RFEM may receive a radiated signal from an air interface via antenna structure 1326 and proceed to filter and amplify (with a low-noise amplifier) the signal. The signal may be provided to a receiver of the transceiver that down-converts the RF signal into a baseband signal that is provided to the baseband processor of the processors 1304.

In the transmit path, the transmitter of the transceiver up-converts the baseband signal received from the baseband processor and provides the RF signal to the RFEM. The RFEM may amplify the RF signal through a power amplifier prior to the signal being radiated across the air interface via the antenna 1326.

In various embodiments, the RF interface circuitry 1308 may be configured to transmit/receive signals in a manner compatible with NR access technologies.

The antenna 1326 may include antenna elements to convert electrical signals into radio waves to travel through the air and to convert received radio waves into electrical signals. The antenna elements may be arranged into one or more antenna panels. The antenna 1326 may have antenna panels that are omnidirectional, directional, or a combination thereof to enable beamforming and multiple input, multiple output communications. The antenna 1326 may include microstrip antennas, printed antennas fabricated on the surface of one or more printed circuit boards, patch antennas, phased array antennas, etc. The antenna 1326 may have one or more panels designed for specific frequency bands including bands in FR1 or FR2.

The user interface circuitry 1316 includes various input/output (I/O) devices designed to enable user interaction with the UE 1300. The user interface 1316 includes input device circuitry and output device circuitry. Input device circuitry includes any physical or virtual means for accepting an input including, inter alia, one or more physical or virtual buttons (for example, a reset button), a physical keyboard, keypad, mouse, touchpad, touchscreen, microphones, scanner, headset, or the like. The output device circuitry includes any physical or virtual means for showing information or otherwise conveying information, such as sensor readings, actuator position(s), or other like information. Output device circuitry may include any number or combinations of audio or visual display, including, inter alia, one or more simple visual outputs/indicators (for example, binary status indicators such as light emitting diodes "LEDs" and multi-character visual outputs, or more complex outputs such as display devices or touchscreens (for example, liquid crystal displays (LCDs), LED displays, quantum dot displays, projectors, etc.), with the output of characters, graphics, multimedia objects, and the like being generated or produced from the operation of the UE 1300.

The sensors 1320 may include devices, modules, or subsystems whose purpose is to detect events or changes in its environment and send the information (sensor data) about the detected events to some other device, module, subsystem, etc. Examples of such sensors include, inter alia, inertia measurement units comprising accelerometers, gyroscopes, or magnetometers; microelectromechanical systems or nanoelectromechanical systems comprising 3-axis accelerometers, 3-axis gyroscopes, or magnetometers; level sensors; flow sensors; temperature sensors (for example, thermistors); pressure sensors; barometric pressure sensors; gravimeters; altimeters; image capture devices (for example, cameras or lensless apertures); light detection and ranging sensors; proximity sensors (for example, infrared radiation detector and the like); depth sensors; ambient light sensors; ultrasonic transceivers; microphones or other like audio capture devices; etc.

The driver circuitry 1322 may include software and hardware elements that operate to control particular devices that are embedded in the UE 1300, attached to the UE 1300, or otherwise communicatively coupled with the UE 1300. The driver circuitry 1322 may include individual drivers allowing other components to interact with or control various input/output (I/O) devices that may be present within, or connected to, the UE 1300. For example, driver circuitry 1322 may include a display driver to control and allow access to a display device, a touchscreen driver to control and allow access to a touchscreen interface, sensor drivers to obtain sensor readings of sensor circuitry 1320 and control and allow access to sensor circuitry 1320, drivers to obtain actuator positions of electro-mechanic components or control and allow access to the electro-mechanic components, a camera driver to control and allow access to an embedded image capture device, audio drivers to control and allow access to one or more audio devices.

The PMIC 1324 may manage power provided to various components of the UE 1300. In particular, with respect to the processors 1304, the PMIC 1324 may control power-source selection, voltage scaling, battery charging, or DC-to-DC conversion.

In some embodiments, the PMIC 1324 may control, or otherwise be part of, various power saving mechanisms of the UE 1300. For example, if the platform UE is in an RRC_Connected state, where it is still connected to the RAN node as it expects to receive traffic shortly, then it may enter a state known as Discontinuous Reception Mode (DRX) after a period of inactivity. During this state, the UE 1300 may power down for brief intervals of time and thus save power. If there is no data traffic activity for an extended period of time, then the UE 1300 may transition off to an RRC Idle state, where it disconnects from the network and does not perform operations such as channel quality feedback, handover, etc. The UE 1300 goes into a very low power state and it performs paging where again it periodically wakes up to listen to the network and then powers down again. The UE 1300 may not receive data in this state; in order to receive data, it must transition back to RRC_Connected state. An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

A battery 1328 may power the UE 1300, although in some examples the UE 1300 may be mounted deployed in a fixed location, and may have a power supply coupled to an electrical grid. The battery 1328 may be a lithium ion battery, a metal-air battery, such as a zinc-air battery, an aluminum-air battery, a lithium-air battery, and the like. In some implementations, such as in vehicle-based applications, the battery 1328 may be a typical lead-acid automotive battery.

FIG. 14 illustrates an example gNB 1400 in accordance with some embodiments. The gNB 1400 may include processors 1404, RF interface circuitry 1408, core network (CN) interface circuitry 1412, memory/storage circuitry 1416, and antenna structure 1426.

The components of the gNB 1400 may be coupled with various other components over one or more interconnects 1428.

The processors 1404, RF interface circuitry 1408, memory/storage circuitry 1416 (including communication protocol stack 1410), antenna structure 1426, and interconnects 1428 may be similar to like-named elements shown and described with respect to FIG. 13.

The CN interface circuitry 1412 may provide connectivity to a core network, for example, a 5th Generation Core network (5GC) using a 5GC-compatible network interface protocol such as carrier Ethernet protocols, or some other suitable protocol. Network connectivity may be provided to/from the gNB 1400 via a fiber optic or wireless backhaul. The CN interface circuitry 1412 may include one or more dedicated processors or FPGAs to communicate using one or more of the aforementioned protocols. In some implementations, the CN interface circuitry 1412 may include multiple controllers to provide connectivity to other networks using the same or different protocols.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

For one or more embodiments, at least one of the components set forth in one or more of the preceding figures may be configured to perform one or more operations, techniques, processes, or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

EXAMPLES

In the following sections, further exemplary embodiments are provided.

Example 1 may include a method of operating a user equipment (UE) comprising generating a UE capability report, the UE capability report to indicate characteristics related to antennas of the UE for phase tracking reference signal (PTRS) signaling, transmitting the UE capability report to a base station, identifying PTRS and physical uplink shared channel (PUSCH) operation configuration information received from the base station, the PTRS and PUSCH operation configuration information based on the UE capability report, and configuring the UE in accordance with the PTRS and PUSCH operation configuration information.

Example 2 may include the method of example 1, wherein the characteristics related to the antennas of the UE indicated by the UE capability report comprise that the UE supports nonCodebook based PUSCH operation, and a maximum number of sounding reference signal (SRS) resources supported by the UE.

Example 3 may include the method of example 2, wherein the characteristics related to the antennas of the UE indicated by the UE capability report further comprise that all noncodebook SRS resources have to be configured in a same SRS resource set, or that the noncodebook SRS resources can be configured in multiple SRS resource sets.

Example 4 may include the method of example 1, wherein the characteristics related to the antennas of the UE indicated by the UE capability report comprise that the UE supports codebook based PUSCH operation, and a maximum number of sounding reference signal (SRS) ports supported by the UE.

Example 5 may include the method of example 4, wherein the characteristics related to the antennas of the UE indicated by the UE capability report further comprise that all SRS ports have to be configured in one SRS resource, or that the SRS ports can be configured in multiple SRS resources.

Example 6 may include the method of example 1, wherein the characteristics related to the antennas of the UE indicated by the UE capability report comprise a number of PTRS ports supported by the UE.

Example 7 may include the method of example 1, wherein the characteristics related to the antennas of the UE indicated by the UE capability report comprise type of coherency supported by the UE, the type of coherency comprising full-coherent coherency, non-coherent coherency, or partial-coherent coherency.

Example 8 may include the method of example 7, wherein the characteristics related to the antennas of the UE indicated by the UE capability report further comprise an indication of an arrangement of the antennas of the UE.

Example 9 may include the method of example 1, wherein the characteristics related to the antennas of the UE indicated by the UE capability report comprise that the UE supports eight transmission (Tx) operation, and type of coherency supported by the UE.

Example 10 may include the method of example 9, wherein the type of coherency is a first coherency, wherein the PTRS and PUSCH operation configuration information indicates that the UE is to be configured with two Tx, and wherein the method further comprises causing the UE to provide an indication that the UE supports second coherency of non-coherent or full-coherent for two Tx.

Example 11 may include the method of example 9, wherein the type of coherency is a first coherency, wherein the first coherency comprises second partial-coherent, wherein the PTRS and PUSCH operation configuration information indicates that the UE is to be configured with four Tx, and wherein the method further comprises causing the UE to provide an indication that the UE supports second coherency of non-coherent or partial-coherent for four Tx.

Example 12 may include the method of example 9, wherein the type of coherency is a first coherency, wherein the first coherency comprises first partial-coherent, wherein the PTRS and PUSCH operation configuration information indicates that the UE is to be configured with four Tx, and wherein the method further comprises causing the UE to provide an indication that the UE supports second coherency of partial-coherent or full-coherent for four Tx.

Example 13 may include a method of operating a user equipment (UE), comprising identifying a UE capability request received from a base station, determining characteristics related to antennas of the UE to be utilized for determining a configuration of the UE for phase tracking reference signal (PTRS) signaling, generating a UE capability report that indicates the determined characteristics related to the antennas, and transmit the UE capability report to the base station.

Example 14 may include the method of example 13, wherein the determined characteristics related to the antennas comprise that the UE supports nonCodebook based physical uplink shared channel (PUSCH) operation, and a maximum number of sounding reference signal (SRS) resources supported by the UE.

Example 15 may include the method of example 13, wherein the determined characteristics related to the antennas comprise that the UE supports codebook based PUSCH operation, and a maximum number of sounding reference signal (SRS) ports supported by the UE.

Example 16 may include the method of example 13, wherein the determined characteristics related to the antennas comprise a number of PTRS ports supported by the UE.

Example 17 may include the method of example 13, wherein the determined characteristics related to the antennas comprise type of coherency supported by the UE.

Example 18 may include a method of operating a base station, comprising transmitting a user equipment (UE) capability request to a UE, identifying a UE capability report received from the UE, the UE capability report to indicate characteristics related to antennas of the UE, determining a configuration for a phase tracking reference signal (PTRS) based on the characteristics related to the antennas, and cause the UE to be configured for the PTRS in accordance with the determined configuration.

Example 19 may include the method of example 18, wherein the characteristics related to the antennas comprise that the UE supports nonCodebook based physical uplink shared channel (PUSCH) operation, and a maximum number of sounding reference signal (SRS) resources.

Example 20 may include the method of example 18, wherein the characteristics related to the antennas comprise that the UE supports codebook based physical uplink shared channel (PUSCH) operation, and a maximum number of sounding reference signal (SRS) ports supported by the UE.

Example 21 may include a method of operating a base station, comprising identifying a user equipment (UE) capability report received from a UE, determining that the UE supports eight transmission (Tx) operation related to phase tracking reference signal (PTRS) signaling based on the UE capability report, determining a configuration for the UE for the PTRS signaling based on the UE supporting the eight Tx operation, and cause the UE to be configured in accordance with the determined configuration.

Example 22 may include the method of example 21, wherein the configuration comprises eight Tx codebook physical uplink shared channel (PUSCH) operation for the UE, and a coherency for the UE.

Example 23 may include the method of example 22, wherein the UE capability report indicates a maximum coherency that the UE supports for eight Tx operation, and wherein the configuration comprises the maximum coherency or a lesser coherency for the UE.

Example 24 may include the method of example 21, wherein the configuration comprises two Tx codebook physical uplink shared channel (PUSCH) operation for the UE, and a coherency for the UE.

Example 25 may include the method of example 24, wherein the UE capability report indicates that the UE supports full-coherent eight Tx operation, first partial-coherent eight Tx operation, or second partial-coherent eight Tx operation, and wherein the coherency for the UE of the configuration comprises full-coherent coherency or non-coherent coherency.

Example 26 may include the method of example 24, wherein the UE capability report indicates that the UE supports non-coherent eight Tx operation, and wherein the coherency for the UE of the configuration comprises non-coherent coherency.

Example 27 may include the method of example 21, wherein the configuration comprises four Tx codebook physical uplink shared channel (PUSCH) operation for the UE, and a coherency for the UE.

Example 28 may include the method of example 27, wherein the UE capability report indicates that the UE supports full-coherent eight Tx operation or first partial-coherent eight Tx operation, and wherein the coherency for the UE of the configuration comprises full-coherent coherency, partial-coherent coherency, or non-coherent coherency.

Example 29 may include the method of example 27, wherein the UE capability report indicates that the UE supports second partial-coherent eight Tx operation, and wherein the coherency for the UE of the configuration comprises partial-coherent coherency or non-coherent coherency.

Example 30 may include the method of example 27, wherein the UE capability report indicates that the UE supports non-coherent eight Tx operation, and wherein the coherency for the UE of the configuration comprises non-coherent coherency.

Example 31 may include the method of example 21, wherein the configuration comprises eight Tx operation for the UE, and more than two PTRS ports for the UE.

Example 32 may include the method of example 31, wherein to cause the UE to be configured in accordance with the determined configuration comprises to cause a sounding reference signal (SRS) resource set to be configured with usage of codebook with eight ports SRS resource, or cause the SRS resource set to be configured with usage of noncodebook with eight SRS resources in the SRS resource set, wherein each SRS resource of the eight SRS resources includes a single port.

Example 33 may include the method of example 31, wherein the more than two PTRS ports for the UE comprise four PTRS ports for the UE, and wherein the configuration comprises a non-coherent coherency for the UE, a second partial-coherent coherency for the UE, or a first partial-coherent coherency for the UE.

Example 34 may include the method of example 21, wherein the configuration comprises a sounding reference signal (SRS) resource set configured with usage of noncodebook, and corresponding PTRS port indexes for each SRS resource within the SRS resource set.

Example 35 may include the method of example 34, wherein the corresponding PTRS port indexes comprise a single PTRS port index from four PTRS port indexes corresponding to the UE for each SRS resource.

Example 36 may include the method of example 21, wherein the configuration comprises eight Tx noncodebook operation for the UE, full-coherent operation for the UE, a sounding reference signal (SRS) resource set configured with usage of noncodebook for the UE, and a PTRS port index for SRS resources within the SRS resource set.

Example 37 may include the method of example 21, wherein the configuration comprises eight Tx noncodebook operation for the UE, first partial-coherent operation for the UE or non-coherent operation for the UE, a sounding reference signal (SRS) resource set configured with usage of noncodebook for the UE, and two different PTRS port indexes for SRS resources with the SRS resource set, wherein each PTRS port index of the two different PTRS port indexes is to be associated with four SRS resources.

Example 38 may include the method of example 21, wherein the configuration comprises eight Tx noncodebook operation for the UE, second partial-coherent operation for the UE or non-coherent operation for the UE, a sounding reference signal (SRS) resource set configured with usage of noncodebook for the UE, and four different PTRS port indexes for SRS resources with the SRS resource set, wherein each PTRS port index of the four different PTRS port indexes is to be associated with two SRS resources.

Example 39 may include a method of operating a user equipment (UE), comprising generating a user equipment (UE) capability report that indicates that the UE supports eight transmission (Tx) operation related to phase tracking reference signal (PTRS) signaling, transmitting the UE capability report to a base station, and identifying a PTRS and physical uplink shared channel (PUSCH) operation configuration received from the base station, the PTRS and PUSCH operation determined based on the UE supporting eight Tx operation, and configuring the UE in accordance with the PTRS and PUSCH operation configuration.

Example 40 may include the method of example 39, wherein the UE capability report indicates a first coherency supported by the UE, wherein the PTRS and PUSCH operation configuration indicates an eight Tx codebook PUSCH operation and a second coherency, the second coherency being a same coherency as or a lesser coherency than the first coherency, and wherein configuring the UE includes configuring the UE with the eight Tx codebook PUSCH operation and the second coherency.

Example 41 may include the method of example 39, wherein the PTRS and PUSCH operation configuration indicates two Tx codebook PUSCH operation and a coherency, and wherein configuring the UE includes configuring the UE with the two Tx codebook PUSCH operation and the coherency.

Example 42 may include the method of example 39, wherein the PTRS and PUSCH operation configuration indicates four Tx codebook PUSCH operation and a coherency, and wherein configuring the UE includes configuring the UE with the four Tx codebook PUSCH operation and the coherency.

Example 43 may include the method of example 39, wherein the PTRS and PUSCH operation configuration indicates the eight Tx operation and more than two PTRS ports, and wherein configuring the UE includes configuring the UE with the eight Tx operation and the more than two PTRS ports.

Example 44 may include the method of example 39, wherein the PTRS and PUSCH operation configuration indicates a sounding reference signal (SRS) resource set to be configured with usage of noncodebook and corresponding PTRS port indexes for each SRS resource within the SRS resource set, and wherein configuring the UE includes configuring the UE with the SRS resource set with each SRS resource of the SRS resource set configured with the corresponding PTRS port indexes.

Example 45 may include an apparatus comprising means to perform one or more elements of a method described in or related to any of examples 1-44, or any other method or process described herein.

Example 46 may include one or more non-transitory computer-readable media comprising instructions to cause an electronic device, upon execution of the instructions by one or more processors of the electronic device, to perform one or more elements of a method described in or related to any of examples 1-44, or any other method or process described herein.

Example 47 may include an apparatus comprising logic, modules, or circuitry to perform one or more elements of a method described in or related to any of examples 1-44, or any other method or process described herein.

Example 48 may include a method, technique, or process as described in or related to any of examples 1-44, or portions or parts thereof.

Example 49 may include an apparatus comprising: one or more processors and one or more computer-readable media comprising instructions that, when executed by the one or more processors, cause the one or more processors to perform the method, techniques, or process as described in or related to any of examples 1-44, or portions thereof Example 50 may include a signal as described in or related to any of examples 1-44, or portions or parts thereof.

Example 51 may include a datagram, information element, packet, frame, segment, PDU, or message as described in or related to any of examples 1-44, or portions or parts thereof, or otherwise described in the present disclosure.

Example 52 may include a signal encoded with data as described in or related to any of examples 1-44, or portions or parts thereof, or otherwise described in the present disclosure.

Example 53 may include a signal encoded with a datagram, IE, packet, frame, segment, PDU, or message as described in or related to any of examples 1-44, or portions or parts thereof, or otherwise described in the present disclosure.

Example 54 may include an electromagnetic signal carrying computer-readable instructions, wherein execution of the computer-readable instructions by one or more processors is to cause the one or more processors to perform the method, techniques, or process as described in or related to any of examples 1-44, or portions thereof Example 55 may include a computer program comprising instructions, wherein execution of the program by a processing element is to cause the processing element to carry out the method, techniques, or process as described in or related to any of examples 1-44, or portions thereof.

Example 56 may include a signal in a wireless network as shown and described herein.

Example 57 may include a method of communicating in a wireless network as shown and described herein.

Example 58 may include a system for providing wireless communication as shown and described herein.

Example 59 may include a device for providing wireless communication as shown and described herein.

Any of the above-described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method comprising:

identifying a user equipment (UE) capability report received from a UE, the UE capability report indicates a supported coherency of the UE, the supported coherency selected from full-coherent coherency, first partial-coherent coherency, second partial-coherent coherency, and non-coherent coherency, the full-coherent coherency indicating a single phase noise source for antennas of the UE, the first partial-coherent coherency indicating two phase noise sources for the antennas of the UE, the second partial-coherent coherency indicating four phase noise sources for the antennas of the UE, and the non-coherent coherency indicating eight phase noise sources for the antennas of the UE;

determining that the UE supports eight transmission (Tx) operation related to phase tracking reference signal (PTRS) signaling based on the UE capability report;

identifying a configuration for the UE for the PTRS signaling based on the UE supporting the eight Tx operation and the supported coherency, wherein the configuration comprises:

eight Tx noncodebook operation for the UE;

full-coherent operation, first partial-coherent operation, second partial-coherent operation, or non-coherent operation of noncodebook for the UE;

a sounding reference signal (SRS) resource set configured with usage of noncodebook for the UE; and four different PTRS port indexes for SRS resources with the SRS resource set, wherein each PTRS port index of the four different PTRS port indexes is to be associated with two SRS resources; and generating, for transmission to the UE, a message indicating the configuration.

2. The method of claim 1, wherein the UE capability report indicates a maximum coherency that the UE supports for eight Tx operation, and wherein the configuration comprises the maximum coherency or a lesser coherency for the UE.

3. The method of claim 1, wherein the UE capability report indicates that the UE supports full-coherent eight Tx operation, first partial-coherent eight Tx operation, or second partial-coherent eight Tx operation.

4. The method of claim 1, wherein the UE capability report indicates that the UE supports full-coherent eight Tx operation or first partial-coherent eight Tx operation.

5. The method of claim 1, wherein the UE capability report indicates that the UE supports second partial-coherent eight Tx operation.

6. The method of claim 1, wherein the configuration comprises corresponding PTRS port indexes for each SRS resource within the SRS resource set.

7. The method of claim 1, wherein the UE capability report indicates that the UE supports noncodebook based physical uplink shared channel (PUSCH) operation.

8. The method of claim 1, wherein the UE capability report indicates that a maximum number of SRS resources for noncodebook.

9. The method of claim 1, wherein the configuration comprises second partial-coherent operation for the UE.

10. The method of claim 1, wherein the configuration comprises non-coherent operation for the UE.

11. The method of claim 1, wherein the capability report further includes an indication of an antenna arrangement of the antennas of the UE.

12. A method comprising:

generating, for transmission to a base station, a user equipment (UE) capability report that indicates that a UE supports eight transmission (Tx) operation related to phase tracking reference signal (PTRS) signaling and that the UE supports a first coherency, the first coherency being selected from full-coherent coherency, first partial-coherent coherency, second partial-coherent coherency, and non-coherent coherency for noncodebook, the full-coherent coherency indicating a single phase noise source for antennas of the UE, the first partial-coherent coherency indicating two phase noise sources for the antennas of the UE, the second partial-coherent coherency indicating four phase noise sources for the antennas of the UE, and the non-coherent coherency indicating eight phase noise sources for the antennas of the UE; and identifying a PTRS and physical uplink shared channel (PUSCH) operation configuration received from the base station, the PTRS and PUSCH operation configuration determined based on the UE supporting eight Tx operation, the PTRS and PUSCH operation configuration indicating an eight Tx noncodebook PUSCH operation and a second coherency for the eight Tx noncodebook PUSCH operation, the second coherency being the full-coherent coherency, the first partial-coherent coherency, the second partial-coherent coherency, or the non-coherent coherency, the UE configured in accordance with the PTRS and PUSCH operation configuration, wherein the UE is configured with eight Tx codebook PUSCH operation and the second coherency.

13. The method of claim 12, wherein the PTRS and PUSCH operation configuration indicates more than two PTRS ports, and wherein to configure the UE includes to configure the UE with the more than two PTRS ports.

14. The method of claim 12, wherein the PTRS and PUSCH operation configuration indicates a sounding reference signal (SRS) resource set to be configured with corresponding PTRS port indexes for each SRS resource within the SRS resource set, and wherein to configure the UE includes to configure the UE with the SRS resource set with each SRS resource of the SRS resource set configured with the corresponding PTRS port indexes.

15. The method of claim 12, further comprising:

generating, for transmission to the base station, a coherency indication message that indicates one or more coherencies that the UE supports.

16. An apparatus comprising:

processing circuitry to:

generate, for transmission to a base station, a user equipment (UE) capability report that indicates that a UE supports eight transmission (Tx) operation related to phase tracking reference signal (PTRS) signaling and that the UE supports a first coherency, the first coherency selected from full-coherent coherency, first partial-coherent coherency, second partial-coherent coherency, and non-coherent coherency, the full-coherent coherency indicating a single phase noise source for antennas of the UE, the first partial-coherent coherency indicating two phase noise sources for the antennas of the UE, the second partial-coherent coherency indicating four phase noise sources for the antennas of the UE, and the non-coherent coherency indicating eight phase noise sources for the antennas of the UE; and identify a PTRS and physical uplink shared channel (PUSCH) operation configuration received from the base station, the PTRS and PUSCH operation configuration determined based on the UE supporting eight Tx operation, the PTRS and PUSCH operation configuration indicating an eight Tx noncodebook PUSCH operation and a second coherency for the eight Tx noncodebook PUSCH operation, the second coherency being the full-coherent coherency, the first partial-coherent coherency, the second partial-coherent coherency, or the non-coherent coherency, the UE configured in accordance with the PTRS and PUSCH operation configuration, wherein the UE is configured with eight Tx codebook PUSCH operation and the second coherency; and interface circuitry coupled to the processing circuitry, the interface circuitry to transmit the UE capability report to the base station.

17. The apparatus of claim 16, wherein the PTRS and PUSCH operation configuration indicates more than two PTRS ports, and wherein to configure the UE includes to configure the UE with the more than two PTRS ports.

18. The apparatus of claim 16, wherein the PTRS and PUSCH operation configuration indicates a sounding reference signal (SRS) resource set to be configured with corresponding PTRS port indexes for each SRS resource within the SRS resource set, and wherein to configure the UE includes to configure the UE with the SRS resource set with each SRS resource of the SRS resource set configured with the corresponding PTRS port indexes.

* * * * *